United States Patent
DelGobbo et al.

(10) Patent No.: US 9,684,699 B2
(45) Date of Patent: Jun. 20, 2017

(54) SYSTEM TO CONVERT SEMANTIC LAYER METADATA TO SUPPORT DATABASE CONVERSION

(71) Applicant: SAS Institute Inc., Cary, NC (US)

(72) Inventors: Vincent C. DelGobbo, Durham, NC (US); Elizabeth J. McIntosh, Cary, NC (US)

(73) Assignee: SAS Institute Inc., Cary, NC (US)

( * ) Notice: Subject to any disclaimer, the term of this patent is extended or adjusted under 35 U.S.C. 154(b) by 60 days.

(21) Appl. No.: 14/956,506

(22) Filed: Dec. 2, 2015

(65) Prior Publication Data

US 2016/0162557 A1     Jun. 9, 2016

Related U.S. Application Data

(60) Provisional application No. 62/087,223, filed on Dec. 3, 2014.

(51) Int. Cl.
*G06F 17/30* (2006.01)

(52) U.S. Cl.
CPC .. *G06F 17/30569* (2013.01); *G06F 17/30389* (2013.01)

(58) Field of Classification Search
CPC ......... G06F 17/30563; G06F 17/30569; G06F 17/3056; G06F 17/30864; G06F 17/30292; G06F 17/30466; G06F 17/30554; G06F 17/30595; G06F 17/30604; G06F 17/30607; Y10S 707/99945; Y10S 707/99943

See application file for complete search history.

(56) References Cited

U.S. PATENT DOCUMENTS

| | | | | |
|---|---|---|---|---|
| 5,970,490 A * | 10/1999 | Morgenstern | ..... | G06F 17/30569 |
| 6,339,775 B1 * | 1/2002 | Zamanian | ......... | G06F 17/30563 |
| 6,609,123 B1 * | 8/2003 | Cazemier | .......... | G06F 17/30607 |
| 6,768,986 B2 * | 7/2004 | Cras | ................. | G06F 17/30398 |
| 7,181,440 B2 * | 2/2007 | Cras | ................. | G06F 17/30398 |
| 7,962,977 B1 * | 6/2011 | Ami | ..................... | G06Q 20/405 5/400 |

(Continued)

OTHER PUBLICATIONS

Mingyuan An, Yang Wang, Weiping Wang, Ninghui Sun "Integrating DBMSs as a Read-Only Execution Layer into Hadoop", 2010 IEEE.*

(Continued)

*Primary Examiner* — Polina Peach
(74) *Attorney, Agent, or Firm* — Bell & Manning, LLC

(57) ABSTRACT

In a system to convert semantic layer metadata to support a database conversion, semantic layer information is read from a semantic layer file defined for an input database. The read semantic layer information is converted to converted semantic layer information using a metadata integration bridge. The converted semantic layer information is loaded as a model. Prologue code is written to a replication code file based on the loaded model. Data source information is identified from the loaded model. Data source information code is written to the replication code file based on the identified data source information. Epilog code is written to the replication code file. Replication code stored in the replication code file is executed to create an information map. Data stored in the input database is accessed using the created information map.

30 Claims, 7 Drawing Sheets

(56) References Cited

U.S. PATENT DOCUMENTS

| | | | | |
|---|---|---|---|---|
| 8,954,375 | B2* | 2/2015 | Kehoe | G06F 8/70 705/348 |
| 9,076,152 | B2* | 7/2015 | Khosravy | G06Q 30/02 |
| 9,201,558 | B1* | 12/2015 | Dingman | G06F 3/048 |
| 2003/0233365 | A1* | 12/2003 | Schmit | G06F 19/28 |
| 2004/0015783 | A1* | 1/2004 | Lennon | G06F 17/30389 715/235 |
| 2004/0093344 | A1* | 5/2004 | Berger | G06F 17/30604 |
| 2004/0093559 | A1* | 5/2004 | Amaru | G06F 17/30604 715/210 |
| 2004/0181543 | A1* | 9/2004 | Wu | G06F 17/30572 |
| 2005/0055369 | A1* | 3/2005 | Gorelik | G06F 17/30292 |
| 2005/0187952 | A1* | 8/2005 | Werner | G06F 17/3056 |
| 2005/0240354 | A1* | 10/2005 | Mamou | G06Q 10/10 702/19 |
| 2005/0246353 | A1* | 11/2005 | Ezer | G06F 17/2247 |
| 2007/0239769 | A1* | 10/2007 | Fazal | G06F 17/30554 |
| 2008/0091709 | A1* | 4/2008 | Chang | G06Q 10/06 |
| 2008/0091720 | A1* | 4/2008 | Klumpp | G06F 8/10 |
| 2009/0319544 | A1* | 12/2009 | Griffin | G06F 17/30563 |
| 2010/0023496 | A1* | 1/2010 | Mohan | G06F 17/30604 707/E17.014 |
| 2010/0174754 | A1* | 7/2010 | B'Far | G06F 17/30507 707/794 |
| 2010/0211580 | A1* | 8/2010 | Sreekanth | G06F 8/10 707/756 |
| 2011/0040717 | A1* | 2/2011 | Rho | G06F 17/30864 706/50 |
| 2011/0040802 | A1* | 2/2011 | Bonatti | G06F 17/30569 707/803 |
| 2011/0295792 | A1* | 12/2011 | Mascarenhas | G06F 17/30489 707/601 |
| 2014/0181154 | A1* | 6/2014 | Amulu | G06F 17/30587 707/803 |
| 2015/0293946 | A1* | 10/2015 | Fong | G06F 17/30294 707/811 |

OTHER PUBLICATIONS

Fong, et al., "Concurrent data materialization for object-relational database with semantic metadata", International Journal of Software Engineering and Knowledge Engineering, vol. 13, No. 3, pp. 257-291,2003.*
SAS Institute Inc. 2013. SAS® 9.4 Intelligence Platform: Overview. Cary, NC: SAS Institute Inc., Dec. 2013, pp. 1-102.
P. Hawking, Creating a Semantic Layer with SAP Business Objects Universe—(Desktop version), SAP University Alliances, Jun. 2012, pp. 1-27.
SAS Institute Inc 2009. SAS® Information Map Studio 4.2: Getting Started with SAS® Information Maps. Cary, NC: SAS Institute Inc., Feb. 2009, pp. 1-62.
SAS Institute Inc. 2013. Base SAS® 9.4 Guide to Information Maps. Cary, NC: SAS Institute Inc., Jul. 2013, pp. 1-178.
SAS Institute Inc. 2014. SAS/ACCESS® 9.4 for Relational Databases: Reference, Sixth Edition. Cary, NC: SAS Institute Inc., Nov. 2014, pp. 1-1066.
Meta Integration® Model Bridge (MIMB) "Metadata Integration" Solution—Description, Printed on Mar. 12, 2015.
Meta Integration® Model Bridge (MIMB) "Metadata Integration" Solution—MIMB Bridge Documentation—MIMB Export Bridge, Printed on Mar. 12, 2015.
Meta Integration® Model Bridge (MIMB) "Metadata Integration" Solution—MIMB Bridge Documentation—MIMB Import Bridge, Printed on Mar. 12, 2015.
About the Greenplum Architecture Pivotal Greenplum Database Docs, Printed on Dec. 23, 2015.
Apache Hadoop 2.7.1, Printed on Dec. 23, 2015.
Setting up a Single Node Cluster, Printed on Dec. 23, 2015.
Business Intelligence Solutions from SAP: Statement of Direction, © 2014 SAP SE or an SAP affiliate company.
Cisco and IBM Informix Database Software: Enhancing Collaboration, Cisco, © 2011 Cisco and/or its affiliates.
Cloudera Distribution for Hadoop for Teradata Administrator Guide, Release 5.4, 5.5, B035-6049-095K, Dec. 2015.
Greenplum Database 4.3.6.2 Release Notes Pivotal Greenplum Database Docs, Printed on Dec. 23, 2015.
Pivotal™ HAWQ® Version 1.3.1, Pivotal HAWQ User's Guide, Rev: 03, Pivotal Software, Inc., Jun. 2015.
HP Vertica for SQL on Hadoop, © Copyright 2014 Hewlett-Packard Development Company, L.P., Oct. 2014.
IBM Data Warehouse Analytics, Printed on Dec. 23, 2015.
IBM Netezza Analytics, Printed on Jan. 4, 2016.
M. Kornacker, Cloudera Impala: A Modern SQL Engine for Apache Hadoop, Jan. 10, 2013.
Introduction to SAP Sybase IQ SAP Sybase IQ 16.0 SP04, Document ID: DC38159-01-1604-01, Copyright © 2014 by SAP AG or an SAP affiliate company, May 2014.
IBM PureData System—Analytics, Printed on Jan. 4, 2016.
Ashdown et al., Oracle Database Concepts, 11g Release 2 (11.2), E40540-04, May 2015, 472 pp.
PostgreSQL 9.5rc1 Documentation by The PostgreSQL Global Development Group, Copyright © 2015 The PostgreSQL Global Development Group.
Teradata JSON Release 15.10, B035-1150-151K, Dec. 2015, pp. 1-180.
Teradata Lifts the Limitations on Open Source R Analytics, Printed on Dec. 23, 2015.

* cited by examiner

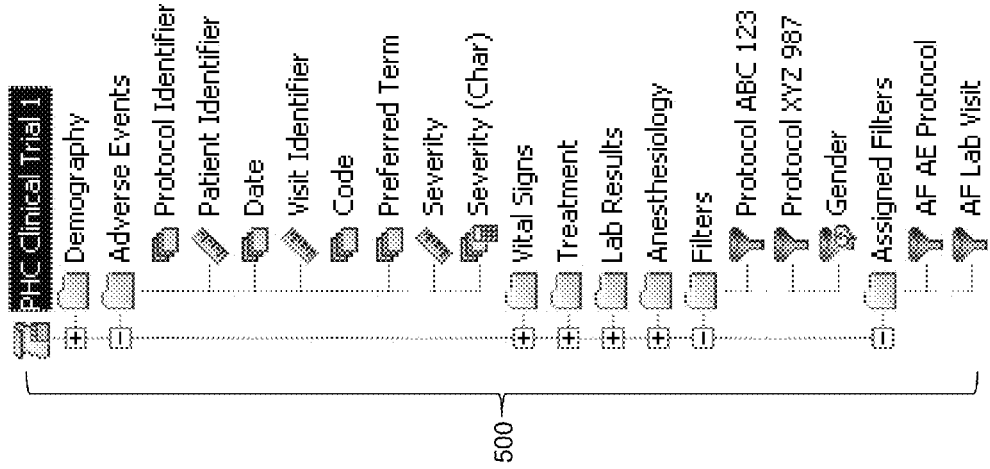

SYSTEM TO CONVERT SEMANTIC LAYER METADATA TO SUPPORT DATABASE CONVERSION

CROSS-REFERENCE TO RELATED APPLICATIONS

The present application claims the benefit of 35 U.S.C. §119(e) to U.S. Provisional Patent Application No. 62/087,223, filed on Dec. 3, 2014, the entire contents of which are hereby incorporated by reference.

BACKGROUND

Many data reporting tools implement a semantic layer between an organization's database and the end user. The semantic layer is a representation of a data warehouse or database that allows the end user to interact with the data without having to understand the complexities of how the data is stored.

SUMMARY

In an example embodiment, a computer-readable medium is provided having stored thereon computer-readable instructions that, when executed by a computing device, cause the computing device to convert semantic layer metadata to support a database conversion. Semantic layer information is read from a semantic layer file defined for an input database. The read semantic layer information is converted to converted semantic layer information using a metadata integration bridge. The converted semantic layer information is loaded as a model. Prologue code is written to a replication code file based on the loaded model. Data source information is identified from the loaded model. Data source information code is written to the replication code file based on the identified data source information. Epilogue code is written to the replication code file. Replication code stored in the replication code file is executed to create an information map. Data stored in the input database is accessed using the created information map.

In another example embodiment, a method of converting semantic layer metadata to support a database conversion is provided.

In yet another example embodiment, a computing device is provided. The system includes, but is not limited to, a processor and a computer-readable medium operably coupled to the processor. The computer-readable medium has instructions stored thereon that, when executed by the computing device, cause the computing device to convert semantic layer metadata to support a database conversion.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 5 depicts an information map structure in accordance with an illustrative embodiment.

DETAILED DESCRIPTION

A semantic layer is a representation of data that helps end users access the data using terminology understood by the end users. Database developers typically build databases with the objective of efficient creation, update, and deletion of data. Users' objectives are to create reports, visualize the data, and/or analyze the data contained in the database to facilitate an understanding of the data in support of decision making. The developers are not usually concerned about whether end users understand the complexities of the underlying data structures. The semantic layer insulates the end users from the underlying data complexity while ensuring the end user is accessing the correct data sources using consistent terminology. The semantic layer enables end users to use common terms rather than the technical database language to access, manipulate, and organize information. Examples of types of semantic layers may include SAP® BusinessObjects™ universes, IBM® Cognos® Framework Manager models, MicroStrategy projects, and SAS® information maps. Each type of semantic layer is supported by its own reporting and analysis tools that are not interchangeable between different types of semantic layers that are designed to operate with a specific database management/architecture system (DBMS).

Figure 1:
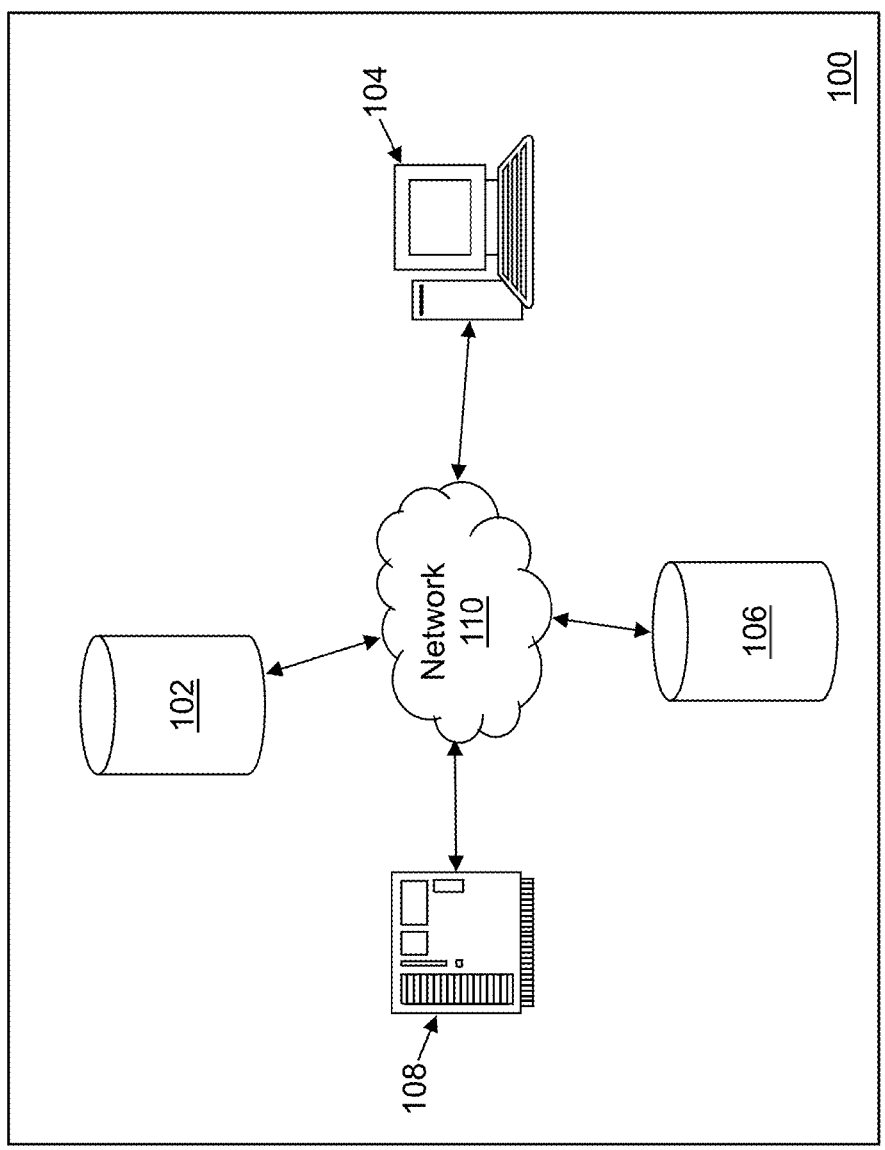
FIG. 1 depicts a block diagram of a semantic layer conversion system in accordance with an illustrative embodiment.

Referring to FIG. 1, a block diagram of a semantic layer conversion system 100 is shown in accordance with an illustrative embodiment. Semantic layer conversion system 100 supports interoperability between reporting and analysis tools and different types of semantic layers as well as a conversion of data from a first type of DBMS to a second type of DBMS. In an illustrative embodiment, semantic layer conversion system 100 may include an input database 102, a user device 104, an output database 106, data access server 108, and a network 110. Semantic layer conversion system 100 converts semantic layer metadata defined for input database 102 to converted semantic layer metadata for output database 106 to transfer data in input database 102 into output database 106 and/or to support reporting and analysis tools that use the converted semantic layer metadata instead of the semantic layer metadata.

Semantic layer conversion system 100 may include a fewer or a greater number of components. Though the illustrative embodiment of FIG. 1 shows semantic layer conversion system 100 implemented in separate devices, the components of semantic layer conversion system 100 may be implemented in a single computing device without network 110, across a plurality of computing devices in a single room or adjacent rooms, in a single facility, and/or distributed geographically. Each of input database 102, user device 104, output database 106, and data access server 108 further may be composed of one or more discrete devices.

Network 110 may include one or more networks of the same or different types. Network 110 can be any type of wired and/or wireless public or private network including a cellular network, a local area network, a wide area network such as the Internet, etc. Network 110 further may comprise sub-networks and consist of any number of devices.

Data access server 108 may facilitate access to input database 102 and/or to output database 106 by user device 104. For example, data access server 108 may include one or more of the SAS® Metadata Server, the SAS® Workspace Server, the SAS/CONNECT® Server, and the SAS/SHARE® Server, all of which are developed and provided by SAS Institute Inc. of Cary, N.C., USA. In alternative embodiments, semantic layer conversion system 100 may not include data access server 108. For example, user device 104 may access input database 102 and output database 106 without use of a server application 310 (shown with reference to FIG. 3) or user device 104 may implement some or all of the operations of server application 310.

Data access server 108 can include any number and any combination of form factors of computing devices. For illustration, FIG. 1 represents data access server 108 as a server computer. In general, a server computer may include faster processors, additional processors, more disk memory, and more random access memory (RAM) than a client computer and support multi-threading as understood by a person of skill in the art. The computing device(s) of data access server 108 send and receive signals through network 110 to/from another of the one or more computing devices of data access server 108 and/or to/from input database 102, output database 106, and/or user device 104.

User device 104 can include any number and any combination of form factors of computing devices such as a laptop, a desktop, a smart phone, a personal digital assistant, an integrated messaging device, a tablet computer, a server computer, etc. User device 104 sends and receives signals through network 110 to/from input database 102, output database 106, and/or data access server 108.

Input database 102 may include one or more databases. Input database 102 may be distributed or non-distributed and may include a database, a data warehouse, a data mart, etc. Input database 102 may be stored on one or more computer-readable media. The data stored in input database 102 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input database 102 may be structured using various formats as known to those skilled in the art including a file system, a relational database, a system of tables, a structured query language database, etc. For example, input database 102 may be implemented using object linking and embedding or open database connectivity. For example, input database 102 may be implemented using a DBMS such as Aster from Aster Data Systems of San Carlos, Calif. USA, DB2 from IBM Corporation of Armonk, N.Y., USA, Greenplum from Pivotal Software Inc. of San Mateo, Calif., USA; Apache Hadoop from the Apache Software Foundation; Impala from Cloudera Inc. of Palo Alto, Calif., USA; Informix from IBM Corporation of Armonk, N.Y., USA; Microsoft SQL Server from Microsoft Corporation of Redmond, Wash., USA; Netezza from Netezza of Marlborough, Mass., USA; Oracle RDBMS from Oracle Corporation of Santa Clara, Calif., USA; SAP HANA, Sybase, Sybase IQ, and R/3 from SAP SE of Walldorf Germany; Teradata from Teradata Corporation of Dayton, Ohio, USA; Vertica Analytics Platform from Vertica of Cambridge, Mass., USA; SAS® LASR™ Analytic Server from SAS Institute Inc. of Cary, N.C., USA; MySQL from Oracle Corporation of Santa Clara, Calif., USA; PostgreSQL from The PostgreSQL Global Development Group; Microsoft Excel from Microsoft Corporation of Redmond, Wash., USA; HAWQ from The Apache Software Foundation, the PI System form OSIsoft® of San Leandro, Calif., USA, etc. Input database 102 further may store data using various compressed formats such as a coordinate format, a compressed sparse column format, a compressed sparse row format, etc.

Output database 106 may include one or more databases. Output database 106 may be distributed or non-distributed and may include a database, a data warehouse, a data mart, etc. Output database 106 may be stored on one or more computer-readable media. The data stored in output database 106 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Output database 106 may be structured using various formats as known to those skilled in the art including a file system, a relational database, a system of tables, a structured query language database, etc. For example, output database 106 may be implemented using a DBMS such as Aster from Aster Data Systems of San Carlos, Calif. USA, DB2 from IBM Corporation of Armonk, N.Y., USA, Greenplum from Pivotal Software Inc. of San Mateo, Calif., USA; Apache Hadoop from the Apache Software Foundation; Impala from Cloudera Inc. of Palo Alto, Calif., USA; Informix from IBM Corporation of Armonk, N.Y., USA; Microsoft SQL Server from Microsoft Corporation of Redmond, Wash., USA; Netezza from Netezza of Marlborough, Mass., USA; Oracle RDBMS from Oracle Corporation of Santa Clara, Calif., USA; SAP HANA, Sybase, Sybase IQ, and R/3 from SAP SE of Walldorf Germany; Teradata from Teradata Corporation of Dayton, Ohio, USA; Vertica Analytics Platform from Vertica of Cambridge, Mass., USA; SAS® LASR™ Analytic Server from SAS Institute Inc. of Cary, N.C., USA; MySQL from Oracle Corporation of Santa Clara, Calif., USA; PostgreSQL from The PostgreSQL Global Development Group; Microsoft Excel from Microsoft Corporation of Redmond, Wash., USA; HAWQ from The Apache Software Foundation, the PI System form OSIsoft® of San Leandro, Calif., USA, etc. Output database 106 further may store data using various compressed formats such as a coordinate format, a compressed sparse column format, a compressed sparse row format, etc. Output database 106 may be structured using a different type of DBMS or the same type of DBMS as that used by input database 102.

Figure 2:
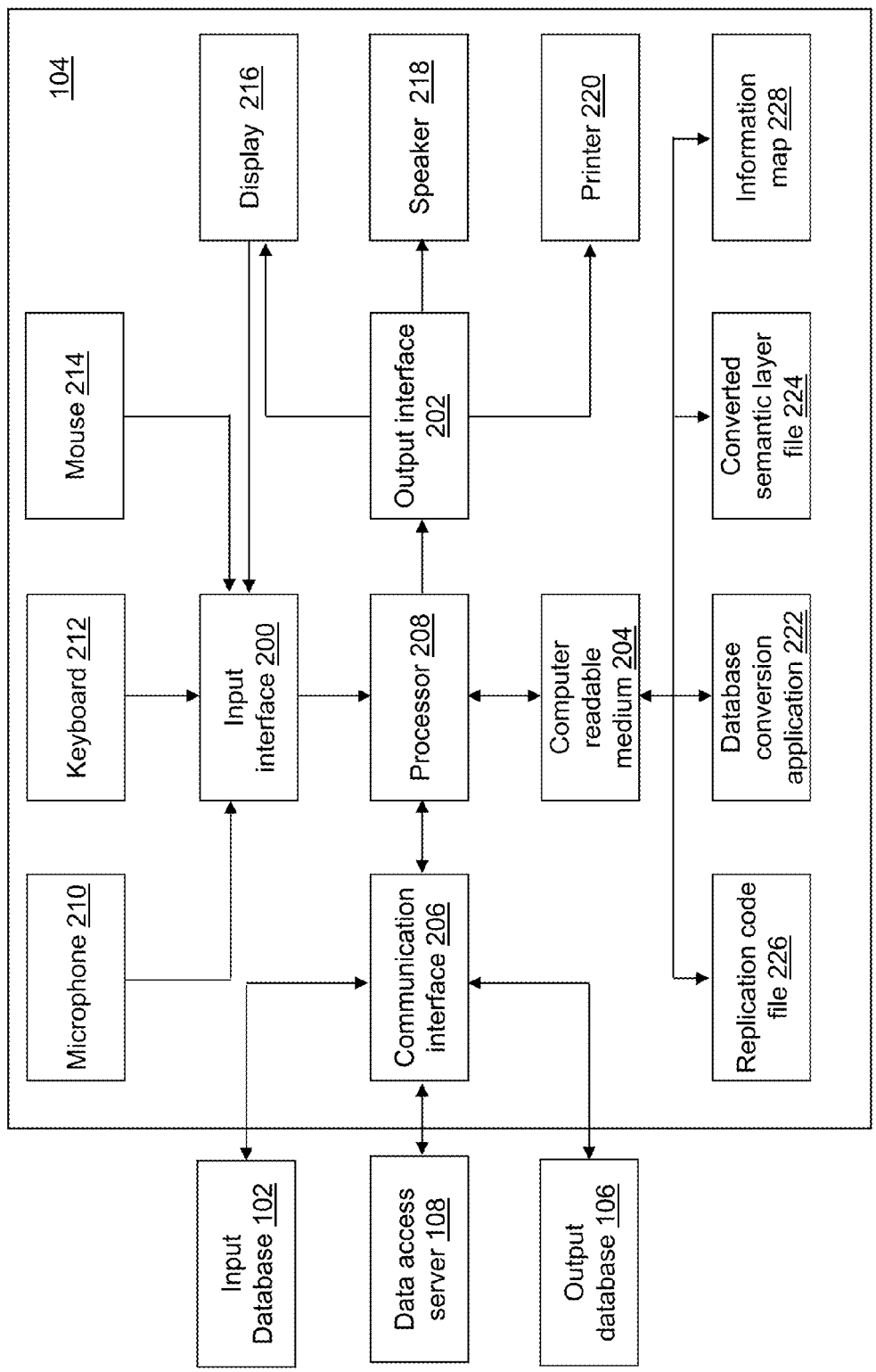
FIG. 2 depicts a block diagram of a user device of the semantic layer conversion system of FIG. 1 in accordance with an illustrative embodiment.

Referring to FIG. 2, a block diagram of user device 104 is shown in accordance with an illustrative embodiment. User device 104 may include an input interface 200, an output interface 202, a computer-readable medium 204, a communication interface 206, a processor 208, a database conversion application 222, a converted semantic layer file 224, a replication code file 226, and an information map (IMAP) 228. Fewer, different, and/or additional components may be incorporated into user device 104.

Input interface 200 provides an interface for receiving information from the user for entry into user device 104 as understood by those skilled in the art. Input interface 200 may interface with various input technologies including, but not limited to, a keyboard 212, a mouse 214, a microphone 210, a display 216, a track ball, a keypad, one or more buttons, etc. to allow the user to enter information into user device 104 or to make selections presented in a user interface displayed on display 216.

The same interface may support both input interface 200 and output interface 202. For example, display 216 comprising a touch screen provides user input and presents output to the user. User device 104 may have one or more input interfaces that use the same or a different input interface technology. The input interface technology further may be accessible by user device 104 through communication interface 206.

Output interface 202 provides an interface for outputting information for review by a user of user device 104. For example, output interface 202 may interface with various output technologies including, but not limited to, display 216, a speaker 218, a printer 220, etc. User device 104 may have one or more output interfaces that use the same or a different output interface technology. The output interface technology further may be accessible by user device 104 through communication interface 206.

Computer-readable medium 204 is an electronic holding place or storage for information so the information can be accessed by processor 208 as understood by those skilled in the art. Computer-readable medium 204 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. User device 104 may have one or more computer-readable media that use the same or a different memory media technology. For example, computer-readable medium 204 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. User device 104 also may have one or more drives that support the loading of a memory media such as a CD, DVD, an external hard drive, etc. One or more external hard drives further may be connected to user device 104 using communication interface 206. For example, input database 102 and/or output database 106 may be stored on computer-readable medium 204 implemented as internal or external hard drives.

Communication interface 206 provides an interface for receiving and transmitting data between devices using various protocols, transmission technologies, and media as understood by those skilled in the art. Communication interface 206 may support communication using various transmission media that may be wired and/or wireless. User device 104 may have one or more communication interfaces that use the same or a different communication interface technology. For example, user device 104 may support communication using an Ethernet port, a Bluetooth antenna, a telephone jack, a USB port, etc. Data and messages may be transferred between user device 104 and input database 102, output database 106, and/or data access server 108 using communication interface 206.

Processor 208 executes instructions as understood by those skilled in the art. The instructions may be carried out by a special purpose computer, logic circuits, or hardware circuits. Processor 208 may be implemented in hardware and/or firmware. Processor 208 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 208 operably couples with input interface 200, with output interface 202, with communication interface 206, and with computer-readable medium 204 to receive, to send, and to process information. Processor 208 may retrieve a set of instructions from a permanent memory device and copy the instructions in an executable form to a temporary memory device that is generally some form of RAM. User device 104 may include a plurality of processors that use the same or a different processing technology.

Database conversion application 222 performs operations associated with creating converted semantic layer file 224 from information stored in a semantic layer file 312 (shown with reference to FIG. 3), creating replication code file 226 from information stored in converted semantic layer file 224, and creating IMAP 228 by executing code stored in the created replication code file 226. Some or all of the operations described herein may be embodied in database conversion application 222. The operations may be implemented using hardware, firmware, software, or any combination of these methods. Referring to the example embodiment of FIG. 2, database conversion application 222 is implemented in software (comprised of computer-readable and/or computer-executable instructions) stored in computer-readable medium 204 and accessible by processor 208 for execution of the instructions that embody the operations of database conversion application 222. Database conversion application 222 may be written using one or more programming languages, assembly languages, scripting languages, etc.

Database conversion application 222 may be implemented as a Web application. For example, database conversion application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Database conversion application 222 may be part of an integrated, distributed application supporting some or all of the same or additional types of functionality as described herein. As an example, database conversion application 222 may be integrated with one or more of the SAS® Visual Analytics suite of products, SAS® Management Console, SAS® Data Integration Studio, SAS® Metadata Bridges, SAS® Foundation, SAS® Intelligence Platform, etc., all of which are offered by SAS Institute Inc. of Cary, N.C., USA.

Figure 3:
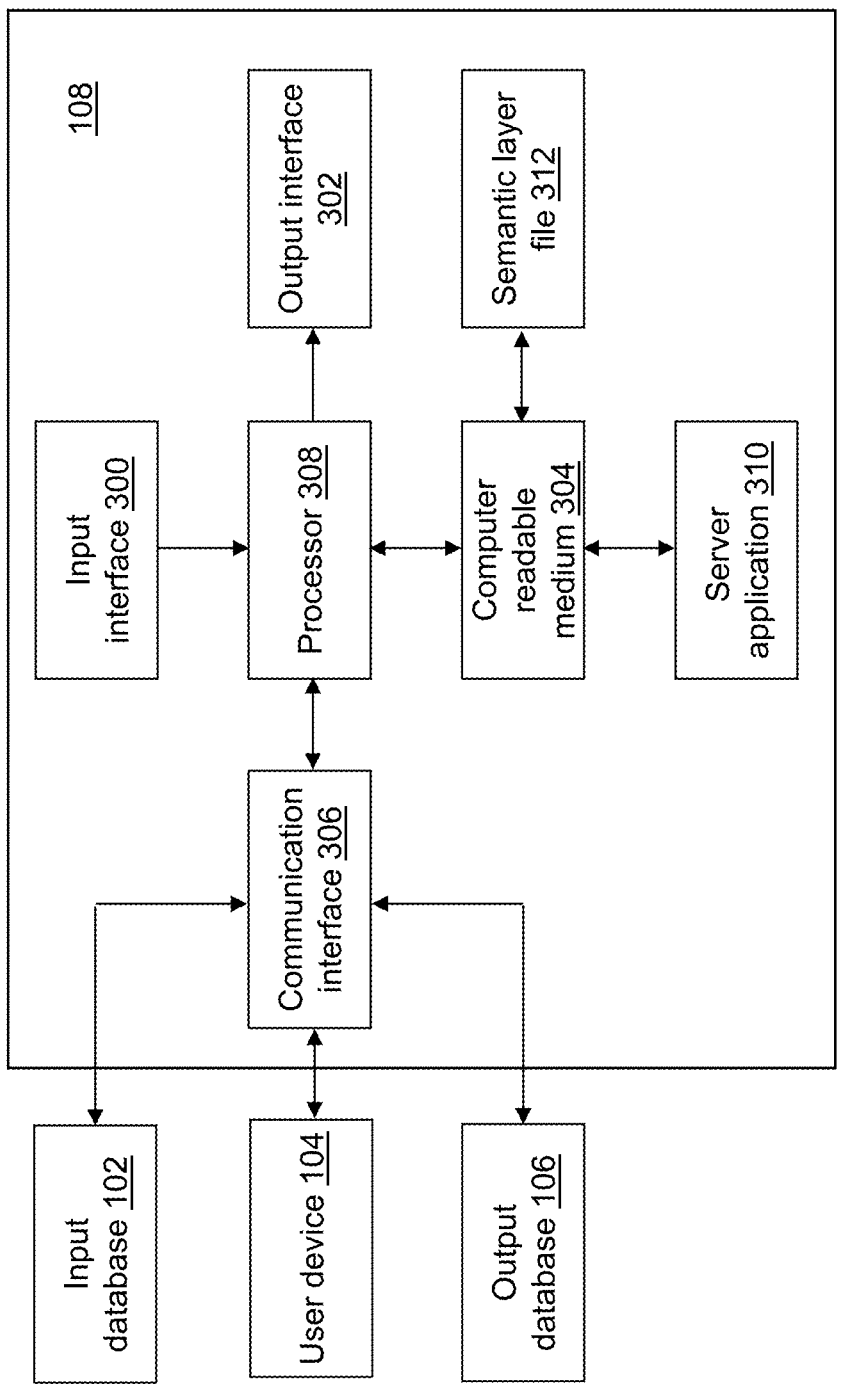
FIG. 3 depicts a block diagram of a data access server of the semantic layer conversion system of FIG. 1 in accordance with an illustrative embodiment.

Referring to FIG. 3, a block diagram of data access server 108 is shown in accordance with an example embodiment. Data access server 108 may include a second input interface 300, a second output interface 302, a second computer-readable medium 304, a second communication interface 306, a second processor 308, server application 310, and semantic layer file 312. Fewer, different, and additional components may be incorporated into data access server 108. Data access server 108 and user device 104 may be different devices or integrated into a single device.

Second input interface 300 provides the same or similar functionality as that described with reference to input interface 200 of user device 104 though referring to data access server 108. Second output interface 302 provides the same or similar functionality as that described with reference to output interface 202 of user device 104 though referring to data access server 108. Second computer-readable medium 304 provides the same or similar functionality as that described with reference to computer-readable medium 204 of user device 104 though referring to data access server 108. Second communication interface 306 provides the same or similar functionality as that described with reference to communication interface 206 of user device 104 though referring to data access server 108. Data and messages may be transferred between data access server 108 and input database 102, output database 106, and/or user device 104 using second communication interface 306. Second processor 308 provides the same or similar functionality as that described with reference to processor 208 of user device 104 though referring to data access server 108.

Server application 310 performs operations associated with facilitating/controlling access to input database 102 and/or to output database 106. Some or all of the operations described herein may be embodied in server application 310. The operations may be implemented using hardware, firmware, software, or any combination of these methods. Referring to the example embodiment of FIG. 3, server application 310 is implemented in software (comprised of computer-readable and/or computer-executable instructions) stored in second computer-readable medium 304 and accessible by second processor 308 for execution of the instructions that embody the operations of server application 310. Server application 310 may be written using one or more programming languages, assembly languages, scripting languages, etc. Server application 310 may be implemented as a Web application.

Server application 310 and database conversion application 222 may be integrated into a single application, may be separately executed applications, or may be part of an integrated, distributed application supporting some or all of the same or additional types of functionality as described herein.

Figure 4A:
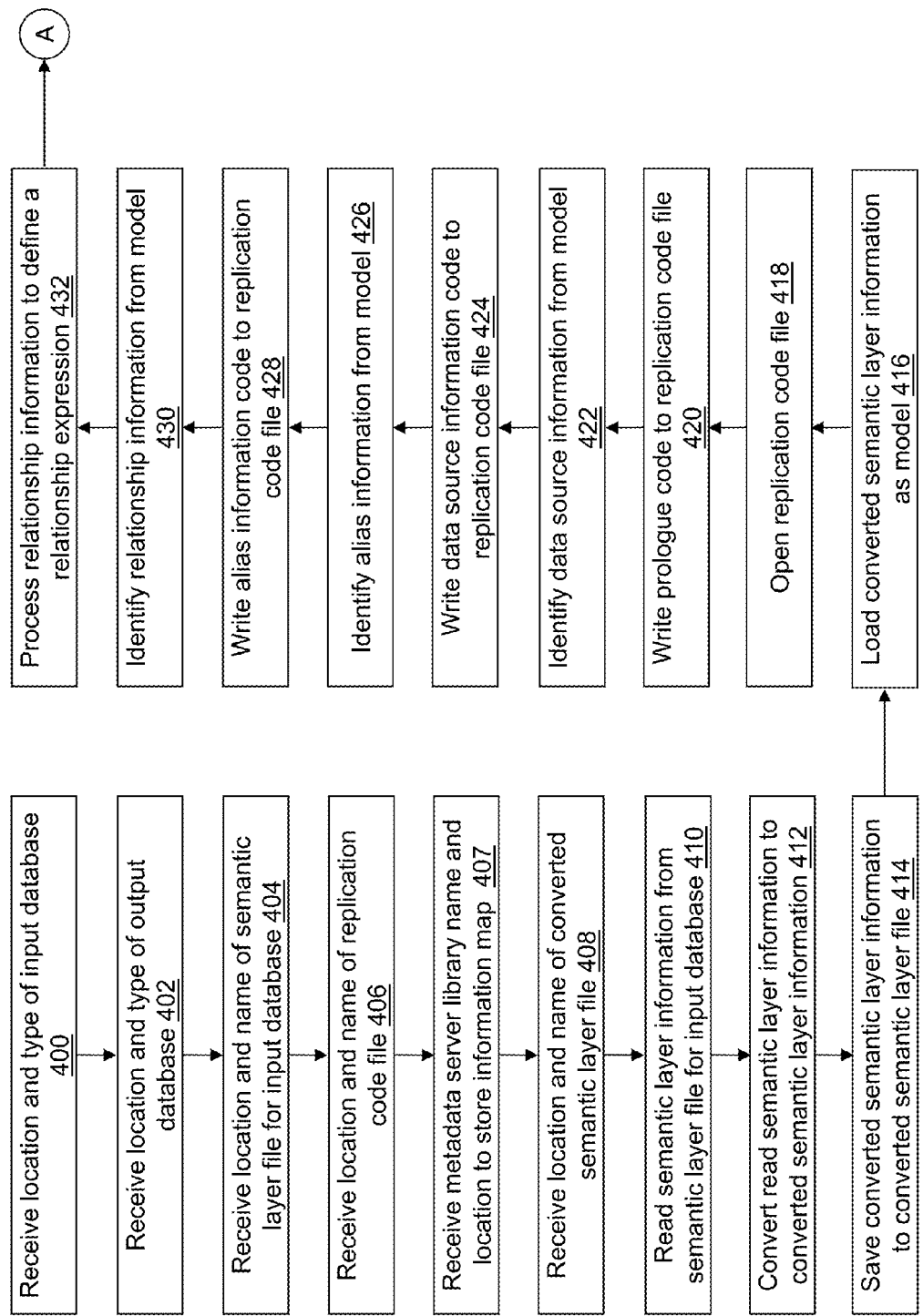
FIGS. 4a, 4b, and 4c depict a flow diagram illustrating examples of operations performed by the user device of the semantic layer conversion system of FIG. 1 in accordance with an illustrative embodiment.
Figure 4B:
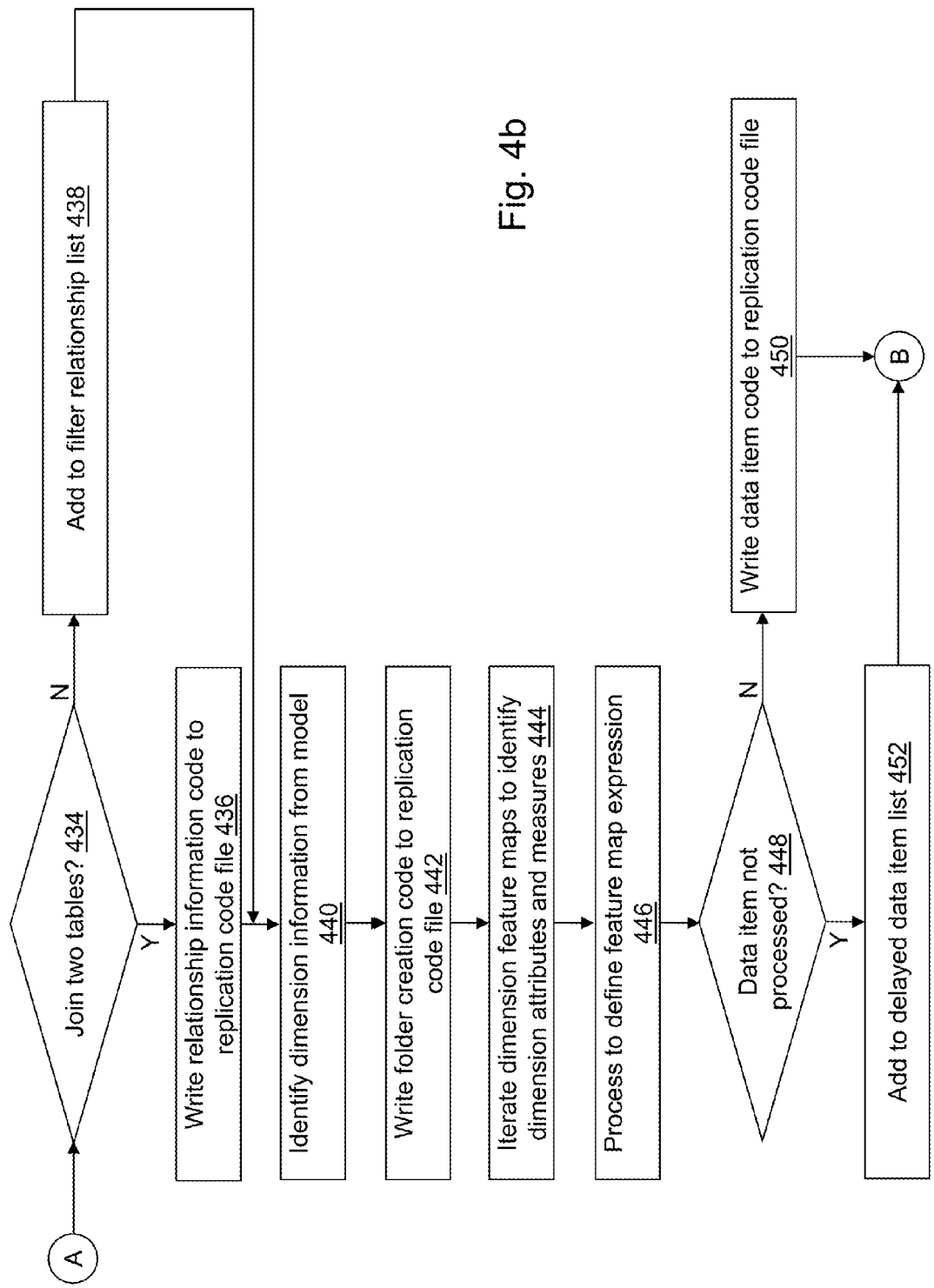
Figure 4C:
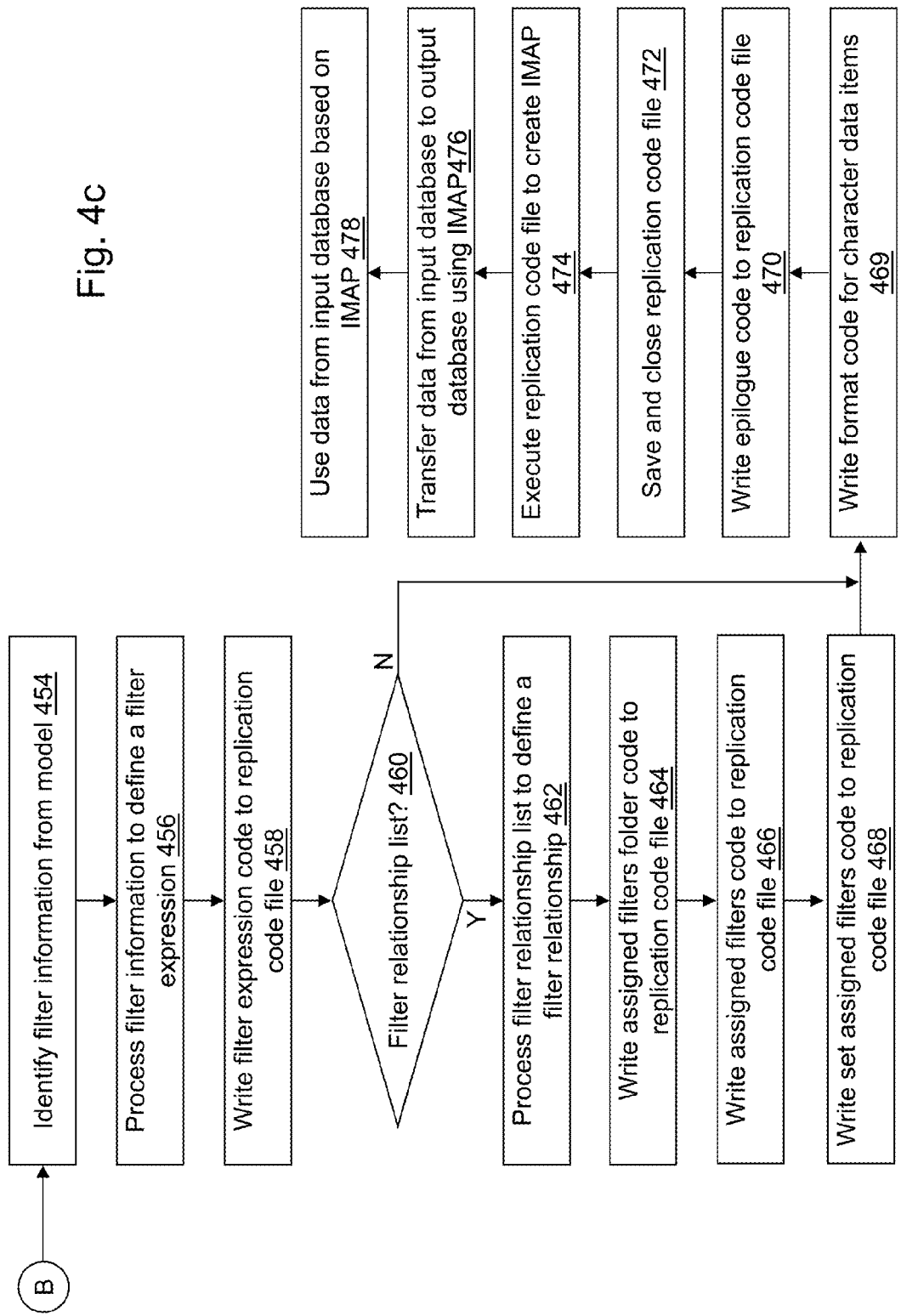

Referring to FIGS. 4a-4c, example operations associated with database conversion application 222 are described. Additional, fewer, or different operations may be performed depending on the embodiment. The order of presentation of the operations of FIGS. 4a-4c is not intended to be limiting. Although some of the operational flows are presented in sequence, the various operations may be performed in various repetitions, concurrently (in parallel, for example, using threads), and/or in other orders than those that are illustrated. For example, a user may execute database conversion application 222, which causes presentation of a first user interface window, which may include a plurality of menus and selectors such as drop down menus, buttons, text boxes, hyperlinks, etc. associated with database conversion application 222 as understood by a person of skill in the art. An indicator may indicate one or more user selections from a user interface, one or more data entries into a data field of the user interface, one or more data items read from computer-readable medium 204 or otherwise defined with one or more default values, etc. that are received as an input by database conversion application 222.

Referring to FIG. 4a, in an operation 400, a first indicator of a location of input database 102 and a type of DBMS of input database 102 is received. The location identifies a computing device, a folder name, and/or a name of input database 102 so that input database 102 can be accessed. Additional information such as user access information, e.g., username, password, etc., further may be provided with the first indicator. As an example, the first indicator may be received by database conversion application 222 after selection from a user interface window or after entry by a user into a user interface window. In an alternative embodiment, input database 102 may not be selectable. For example, a most recently created or accessed database may be used automatically. The type of DBMS of input database 102 provides an indicator of which DBMS was used to structure input database 102. A default value for the first indicator may be stored in computer-readable medium 204 and received by reading the default value from computer-readable medium 204.

In an operation 402, a second indicator of a location and a type of DBMS of output database 106 is received. The location identifies a computing device, a folder name, and/or a name of output database 106 so that output database 106 can be accessed. Additional information such as user access information, e.g., username, password, etc., further may be provided with the second indicator. As an example, the second indicator may be received by database conversion application 222 after selection from a user interface window or after entry by a user into a user interface window. In an alternative embodiment, output database 106 may not be selectable. For example, a most recently created database may be used automatically. The type of DBMS of output database 106 provides an indicator of which DBMS to use to create or to update output database 106 using data stored in input database 102. A default value for the second indicator may be stored in computer-readable medium 204 and received by reading the default value from computer-readable medium 204.

In an operation 404, a third indicator of a location and a name of semantic layer file 312 is received. The third indicator identifies a computing device, a folder name, and/or a filename that indicate where semantic layer file 312 is stored. Additional information such as user access information, e.g., username, password, etc., further may be provided with the third indicator. As an example, the third indicator may be received by database conversion application 222 after selection from a user interface window or after entry by a user into a user interface window. In an alternative embodiment, the first indicator may be read from semantic layer file 312. A default value for the third indicator may be stored in computer-readable medium 204 and received by reading the default value from computer-readable medium 204.

In an operation 406, a fourth indicator of a location and a name of replication code file 226 is received. The fourth indicator identifies a computing device, a folder name, and/or a filename to indicate where replication code file 226 will be stored. Additional information such as user access information, e.g., username, password, etc., further may be provided with the fourth indicator. As an example, the fourth indicator may be received by database conversion application 222 after selection from a user interface window or after entry by a user into a user interface window. A default value for the fourth indicator may be stored in computer-readable medium 204 and received by reading the default value from computer-readable medium 204.

In an operation 407, a fifth indicator of a location and a name of IMAP 228 is received. The fifth indicator identifies a metadata repository and/or a name of IMAP 228 to indicate where IMAP 228 will be stored. As an example, the fifth indicator may be received by database conversion application 222 after selection from a user interface window or after entry by a user into a user interface window. A default value for the fifth indicator may be stored in computer-readable medium 204 and received by reading the default value from computer-readable medium 204. The fifth indicator further may identify general options associated with the creation of IMAP 228.

In an operation 408, a sixth indicator of a location and a name of converted semantic layer file 224 is received. The sixth indicator identifies a computing device, a folder name, and/or a filename to indicate where converted semantic layer file 224 will be stored. Additional information such as user access information, e.g., username, password, etc., further may be provided with the sixth indicator. As an example, the sixth indicator may be received by database conversion application 222 after selection from a user interface window or after entry by a user into a user interface window. A default value for the sixth indicator may be stored in computer-readable medium 204 and received by reading the default value from computer-readable medium 204.

In an operation 410, semantic layer information is read from semantic layer file 312. For example, semantic layer file 312 is opened and a content of semantic layer file 312 is stored to a RAM or cache type computer-readable medium 204. The semantic layer information may be stored as metadata that is descriptive data about data that is stored and managed in a database to facilitate access to captured and archived data for further use. A metadata model provides a definition of the metadata for a set of objects. The metadata model describes the attributes for each object, as well as the relationships between objects within the model. A metadata object includes a set of attributes that describe a table, a server, a user, or another resource on a network. The specific attributes that a metadata object includes vary depending on which metadata model is being used. A metadata repository includes a collection of related metadata objects, such as the metadata for a set of tables and columns that are maintained by an application. A metadata server includes a server that provides metadata management services to one or more client applications.

In an operation 412, the read semantic layer information is converted to converted semantic layer information based on the type of DBMS of input database 102 and data stored in input database 102. For example, the SAS® Metadata Bridge may connect to, read, and gather information from semantic layer file 312 using Meta Integration (MITI) bridge software provided by Meta Integration Technology, Inc. of Mountain View, Calif., USA. The MITI bridge software may be integrated with database conversion application 222. The MITI bridge software may be based on the type of DBMS of input database 102 indicated by the first indicator. The MITI bridge software may have a public application programming interface (API) that is called by database conversion application 222. The MITI bridge software processes the semantic layer information read from semantic layer file 312 and converts the semantic layer information to converted semantic layer information that is understood by database conversion application 222.

For example, database conversion application 222 is started as a Windows executable with a number of command line options:

```
host appserver.mydomain.com
port 7980
user myUserid
password MyPassword
log "C:\some-directory\myLog.txt"
bridgeIdentifier myBridgeIdentifier
bridgeDirectory                    "C:\some-
    directory\SASMetadataBridges\n.n"
bridgeOptions                      "C:\some-
    directory\myBridgeOptions.xml"
infoMapOptions                     "C:\some-
    directory\myIMAPOptions.xml"
```

Host, port, user, password, and BridgeIdentifier are used to connect to a SAS application server mid-tier to verify that a requested SAS metadata bridge is licensed. The bridgeDirectory option specifies a location of installation files for the the SAS® Metadata Bridge software. Each bridge has a different set of options and those options are stored in a file specified by the bridgeOptions option. For example, the bridge to SAP® BusinessObjects™ universes files includes options such as a BusinessObjects username and password, authentication mode (e.g., lightweight directory access protocol, Windows® Active directory, etc.), and execution mode (e.g., silent or interactive). The bridge options may be very different based on the type of bridge being used. Some bridges need only a file name. Other bridges need connection information or even multiple sets of connection information and other inputs.

Below is a sample of the myIMAPOptions.xml file specified in the infoMapOptions option above:

```
<?xml version="1.0" encoding="UTF-8"?>
<InfoMapImportOptions>
    <Option name="importname" value="MyImport1"/>
    <Option name="metaserver" value="server-name"/>
    <Option name="metaport" value="server-port"/>
    <Option name="metauser" value="user-id"/>
    <Option name="metapass" value="user-password"/>
    <Option name="libname" value="phcdata"/>
    <Option name="libraryname" value="PHC Clinical Trial Data"/>
    <Option name="mappath" value="/meta-folder/meta-subfolder/"/>
    <Option name="domain" value="authentication-domain"/>
    <Option name="sasserver" value="SASApp"/>
    <Option name="extfuncpath" value="/directory/subdirectory"/>
    <Option name="create_target_folder" value="yes"/>
    <Option name="auto_replace" value="yes"/>
    <Option name="init_cap" value="no"/>
    <Option name="replace_underscores" value="no"/>
    <Option name="use_labels" value="no"/>
    <Option name="verify" value="no"/>
    <Option name="force_ip1" value="coalesce(0,1) ne ."/>
    <Option name="use_name_for_empty_description" value="true"/>
</InfoMapImportOptions>
```

These options control construction of IMAP 228. "Importname" defines a unique name to identify an import run. Information about this run is maintained and stored for subsequent executions of the same semantic layer. "Metaserver", "metaport", "metaport", and "metapass" are used in an OPTIONS statement in prologue code as described below.

"Libname" defines a library reference to use for input database 102. "Libraryname" defines a name of a library in SAS metadata that corresponds to input database 102. The Libname and Libraryname options are used to construct a LIBNAME statement such as "libname phcdata meta library='PHC Clinical Trial Data';" described further below. "Mappath", "domain", and "sasserver" are also described further below.

"Extfuncpath" defines a full path to a location of a SAS External Functions data set that may be used with a SAS/

ACCESS to Relational Databases product to extend DBMS functions natively supported by the product. It is used to construct a LIBNAME statement such as "libname extfunc '/directory/subdirectory/'access=read;" described further below. "Create_target_folder", "Auto_replace", "Init_cap", "Replace_underscores", "Use_labels", "Verify" are also described further below.

"Force_ip1" defines a code string to use, verbatim, to force the SAS SQL procedure to use implicit pass-through. This is generally not changed by a user, and is added to DBMS SQL code that is generated by IMAP 228 and is further explained below. The data item name for the description is used when a description in semantic layer file 312 is empty/blank and when "use_name_for_empty_description" is "true".

The MITI bridge software processes the semantic layer information read from semantic layer file 312 and converts the semantic layer information to converted semantic layer information that is understood by database conversion application 222.

In an operation 414, the converted semantic layer information is saved to converted semantic layer file 224. For example, the MITI bridge software may return converted semantic layer information in an extensible markup language (XML) format, which is an XML metadata interchange (XMI) representation of a meta integration repository (MIR) model. The returned converted semantic layer information is written to converted semantic layer file 224.

Operations 410, 412, and 414 may be performed by calling a single MITI method that reads semantic layer file 312 and creates the converted semantic layer file 224. For illustration, sample code is provided below to perform operations 410, 412, and 414:

```
result = _driver.executeImportExport(importTool, null, importValueMap,
   exportBridgeIdentifier, null, exportValueMap,
   ValidationLevelType.NONE, new MIMBLog(logger),
   MessageLiteral.DEBUG);
```

"ImportTool" defines a bridge identifier used to import semantic layer file 312. "ImportValueMap" contains information about semantic layer file 312, such as a location, connection information, options, etc. "exportBridgeIdentifier" defines a bridge identifier used to create converted semantic layer file 224. For example, the bridge creates the MIR XML file that contains a normalized view of semantic layer file 312. "exportValueMap" contains a location to store converted semantic layer file 224. "ValidationLevel Type.NONE" indicates that validation of the MIR model is not performed. Other available options include "new MIMBLog(logger)" that passes in a new Meta Integration log object to hold logging info, and "MessageLiteral.DEBUG" that requests that debug-level messages be written to the log object. Other options may be available.

In an operation 416, the converted semantic layer information is read from converted semantic layer file 224 and loaded as a model. For example, a Meta Integration Java® API may be used to load the model read from converted semantic layer file 224. For example, a single MITI method may read the converted semantic layer file 224 and load it as a model. For illustration, "MIRObject model=MIRMIXImport.load(inputFile, mirLogger);" is sample code to perform operation 416.

In an operation 418, replication code file 226 is opened for writing. In an illustrative embodiment, execution of replication code file 226 creates IMAP 228. Replication code file 226 is created from the loaded model and may be based on one or more data sources, which can be tables or cubes.

For illustration, information describing an information map can be found in SAS Institute Inc. 2013. *Base SAS® 9.4 Guide to Information Maps*. Cary, N.C.: SAS Institute Inc. hereby incorporated by reference in its entirety. SAS® Information Map Studio provides a graphical user interface that enables creation, modification, and management of SAS Information Maps. Information maps based on more than one table data source contain relationships that define how the data sources are joined. An information map may further include data items and filters, which are used to build queries. A data item can refer to a data field or a calculation. A data item further can refer to a physical data source such as one or more columns from a table. A data item can also refer to one or more other data items in the same information map. A data item is classified as either a measure item or a category item. Measure items can be used for calculations. Category items are used to group measure items. Filters contain criteria for sub-setting the data that is returned in a query. Folders can be used to organize the data items and filters so that database users can easily locate information within the information map.

The INFOMAPS procedure included in *Base SAS® 9.4* enables creation of information maps programmatically and can be used to modify an existing information map by adding new data sources, data items, filters, folders, or relationships or to change the definitions of any existing data item, filter, data source, folder, or relationship within an information map. The INFOMAPS procedure syntax is provided below:

```
PROC INFOMAPS <options>;
   CLOSE INFOMAP;
   DELETE DATAITEM _ALL_ | ID="data-item-ID" <option>;
   DELETE DATASOURCE _ALL_ | ID="data-source-ID" <option>;
   DELETE FILTER _ALL_ | ID="filter-ID"<option>;
   DELETE IDENTITY_PROPERTY _ALL_ | ID="identity-property-ID";
   DELETE INFOMAP "information-map-name" <options>;
   DELETE RELATIONSHIP _ALL_ | ID="relationship-ID" <option>;
   EXPORT FILE=fileref | "physical-location" <options>;
   EXPORT LOCALIZABLE_PROPERTIES FILE="physical-location" <option>;
   IMPORT FILE="physical-location";
   IMPORT LOCALIZED_PROPERTIES FILE="base-location"LOCALES=(locale-1
      <... locale-n>);
   INSERT DATAITEM <options>;
   INSERT DATASOURCE <options>;
   INSERT DATE_PROMPT DISPLAYED_TEXT="displayed-text" <options>;
   INSERT FILTER CONDITION="conditional-expression" <options>;
   INSERT FOLDER "folder-name" <options>;
```

```
INSERT IDENTITY_PROPERTY PROPERTY=property-
   keyword<ID="identity_property-ID">;
INSERT NUMERIC_PROMPT DISPLAYED_TEXT="displayed-text" <options>;
INSERT RELATIONSHIP <options>;
INSERT TEXT_PROMPT DISPLAYED_TEXT="displayed-text" <options>;
INSERT TIME_PROMPT DISPLAYED_TEXT="displayed-text" <options>;
INSERT TIMESTAMP_PROMPT DISPLAYED_TEXT="displayed-text" <options>;
LIST <options>;
MOVE DATAITEM "data-item-ID"| ID_LIST=("data-item-ID-1" <... "data-item-ID-
   n">) NEW_LOCATION="new-folder-location" </CREATE>;
MOVE FILTER "filter-ID" | ID_LIST=("filter-ID-1" <... "filter-ID-n">)
   NEW_LOCATION="new-folder-location" </CREATE>;
MOVE FOLDER "folder-name" NEW_LOCATION="new-folder-location"
   </CREATE> <option>;
NEW INFOMAP "information-map-name" <options>;
SAVE <options>;
SET ASSIGNED_FILTERS DEFINITION=(<data-source-filters-1<... data-source-
   filters-n>>);
SET STORED PROCESS NAME="stored-process-name" <option>;
UPDATE CURRENT_INFOMAP <options>;UPDATE DATAITEM "data-item-ID"
   <options>;
UPDATE DATASOURCE "data-source-ID" <options>;
UPDATE FILTER "filter-ID" <options>;
UPDATE FOLDER "folder-name" <options>;UPDATE INFOMAP "information-
   map-name" <options>;
UPDATE MAP_PERMISSIONS GROUP="identity" | USER="identity"permission-
   specification-1 <... permission-specification-n>;
```

The INFOMAPS procedure may include the following optional arguments:
  DOMAIN="authentication-domain", which specifies an authentication domain to which to associate the user ID and password;
  ERRORSTOP|NOERRORSTOP", which specifies whether the INFOMAPS procedure terminates when a syntax or run-time error is encountered while the procedure is executed in batch mode;
  MAPPATH="location", which specifies the location within the metadata server for the information map to create, open, or delete;
  METACREDENTIALS=YES|NO, which specifies whether the user ID and password specified in the METAUSER= and METAPASS= system options are retrieved and used to connect to the metadata server when the METAUSER= and METAPASS= options for the PROC INFOMAPS statement are omitted;
  METAPASS="password", which specifies the password that corresponds to the user ID that connects to the metadata server;
  METAPORT=port-number, which specifies the TCP port that the metadata server is listening to for connections;
  METASERVER="address", which specifies the network IP (Internet Protocol) address of the computer that hosts the metadata server; and
  METAUSER="user-ID", which specifies the user ID to connect to the metadata server.

After the connection is made, the "location" defined by MAPPATH= is stored so that it does not need to be specified again on subsequent statements such as NEW INFOMAP, UPDATE INFOMAP, DELETE INFOMAP, SAVE, or EXPORT. However, if a location is specified on a subsequent statement in the same PROC INFOMAPS step, then that location overrides the stored location.

The EXPORT statement of the INFOMAPS procedure exports an XML representation of an information map to "physical-location" and includes the following optional arguments:
  INFOMAP "information-map-name", which specifies the name of the information map to export; and
  MAPPATH="location", which specifies the location within the SAS folders tree for the information map to export.

The EXPORT LOCALIZABLE_PROPERTIES statement of the INFOMAPS procedure exports the localizable properties of one or more information maps to an external file defined by "physical-location" and includes the following optional arguments:
  INFOMAP="location" <keep-drop-list>
  INFOMAP=("location-1" <keep-drop-list-1> <... "location-n" <keep-drop-list-n>>, which specifies the location(s) and names of the information maps for which localized properties are exported, where "location" specifies a location within the SAS folders tree that contains the information maps for which properties are exported, the <keep-drop-list> specifies the names of information maps from the specified location to include in or exclude from the export process, and the keep-drop-list value has the form: (information-map-name-1< . . . information-map-name-n>)</KEEP|/DROP>; and
  MAPPATH="location", which specifies the location within the SAS folders tree for the information map to export.

The IMPORT statement of the INFOMAPS procedure imports an information map from an external XML file. The IMPORT LOCALIZED_PROPERTIES statement imports localized properties from external files into one or more existing information maps.

The INSERT DATAITEM statement of the INFOMAPS procedure makes the data from either a table or a cube available to the current information map and includes the following syntax forms:
  Form 1: INSERT DATAITEM COLUMN="data-source-ID"."column-name" <options>;
  Form 2: INSERT DATAITEM EXPRESSION="expression-text" <options>;
  Form 3: INSERT DATAITEM HIERARCHY="dimension"."hierarchy" <options>; and Form 4: INSERT DATAITEM MEASURE="OLAP-measure" <options>;
where COLUMN="data-source-ID"."column-name" specifies a column;
EXPRESSION="expression-text" specifies the combination of data elements, literals, functions, and mathematical operators that are used to derive the value of a data item when the information map is used in a query;
HIERARCHY="dimension"."hierarchy" specifies a physical hierarchy; and
MEASURE="OLAP-measure" specifies a physical measure.

The INSERT DATAITEM statement of the INFOMAPS procedure includes the following optional arguments:
    ACTIONS=(actions-list), which tells an application that uses the information map what actions it can present to its users to perform on the result data set returned by the information map;
    AGGREGATION=aggregate-function, which specifies how a measure data item is aggregated when it is used in a query;
    AGGREGATIONS_DROP_LIST=(aggregate-function-list), which removes one or more functions from the set of aggregate functions available to a data item;
    AGGREGATIONS_KEEP_LIST=(aggregate-function-list), which specifies the aggregate functions that are available to a data item;
    CLASSIFICATION=CATEGORY|MEASURE, which specifies whether the data item is a category or a measure;
    CUSTOM_PROPERTIES=(custom-properties-list), which specifies additional properties for the data item;
    DESCRIPTION="descriptive-text", which specifies the description of the data item;
    FOLDER="folder-name"
        </CREATE>FOLDER="folder-location"</CREATE>, which specifies the folder in the information map into which to insert the data item;
    FORMAT="format-name", which specifies the format of the data item;
    ID="data-item-ID", which specifies the ID assigned to the data item being inserted;
    NAME="data-item-name", which specifies the name assigned to the data item in the information map;
    TYPE=NUMERIC|CHARACTER|DATE|TIME|TIMESTAMP, which specifies the data type of the data item's expression; and
    VALUE_GENERATION=NONE|DYNAMIC|(custom-values-list), which specifies what method an application that uses the information map is to use in generating a list of values for this data item to present to a user.

The INSERT DATASOURCE statement of the INFOMAPS procedure makes the data from either a table or a cube available to the current information map and includes the following syntax forms:
    Form 1: INSERT DATASOURCE SASSERVER="application-server-name" TABLE="library"."table" <options>; and
    Form 2: INSERT DATASOURCE SASSERVER="application-server-name" CUBE=<"schema".>"cube" <options>;
where CUBE=<"schema".>"cube" identifies an online analytical processing (OLAP) cube as a data source for the current information map, and TABLE="library"."table" identifies a relational table as a data source for the current information map.

The INSERT DATASOURCE statement of the INFOMAPS procedure includes the following optional arguments:
    _ALL_, which specifies to insert a data item for each physical column or hierarchy as defined in the specified table or cube;
    COLUMNS=(column-1 < . . . column-n>), which specifies one or more physical column names as defined in the specified table;
    DESCRIPTION="descriptive-text", which specifies the description of the data source;
    ID="data-source-ID", which specifies the ID assigned to the data source;
    NAME="data-source-name", which enables specification of a descriptive name for each data source inserted in an information map; and
    REQUIRED_DATASOURCE=YES|NO, which specifies whether the data source is added to the list of required data sources for the information map.

The INSERT DATE_PROMPT statement of the INFOMAPS procedure inserts a date prompt into the current information map. The INSERT NUMERIC_PROMPT statement of the INFOMAPS procedure inserts a numeric prompt into the current information map. The INSERT TEXT_PROMPT statement of the INFOMAPS procedure inserts a text prompt into the current information map. The INSERT_TIME_PROMPT statement of the INFOMAPS procedure inserts a time prompt into the current information map.

The INSERT FILTER statement of the INFOMAPS procedure inserts a filter into the current information map. A filter provides criteria for subsetting a result set. For relational databases, a filter is a WHERE clause. The INSERT FILTER statement has the following syntax: INSERT FILTER CONDITION="conditional-expression" <options>, where the following rules apply to the conditional-expression value:
    For relational data, any reference to physical data in a relational table is enclosed in double angle brackets (<< >>). Everything between the double angle brackets is maintained as is, such that case and blanks are maintained. To refer to a physical column, the column is qualified with the data source ID (e.g., <<Transaction.Sales_Tax>>). To refer to a data item in an expression in the current information map, the data item ID does not need to be qualified. To refer explicitly to the current information map a root is specified as the qualifier (e.g., root.MODEL_ID>>).
    For OLAP data, expressions for OLAP data items resolve to a valid, one-dimensional expressions set. Double angle brackets (<< >>) are used to enclose references to an OLAP measure, OLAP dimension, OLAP hierarchy, or an OLAP level. Single sets of square brackets ([ ]) are used to enclose a reference to an OLAP member.

The INSERT FILTER statement of the INFOMAPS procedure includes the following optional arguments:
    CUSTOM_PROPERTIES=(custom-properties-list), which specifies additional properties for the filter where the form of the custom-properties-list value is ("property-name-1" "property-value-1" <"description-1">) . . . ("property-name-n" "property-value-n" <"description-n">);
    DESCRIPTION="descriptive-text", which specifies the description of the filter to be inserted;
    FOLDER="folder-name" </CREATE>

FOLDER="folder-location" </CREATE>, which specify the folder in the information map into which to insert the filter;

HIDDEN=YES|NO, which specifies whether to hide the filter from users of the information map;

ID="filter-ID", which specifies the ID of the filter to insert; and

NAME="filter-name", which specifies the name of a filter to insert into the current information map.

The INSERT FOLDER statement of the INFOMAPS procedure inserts a folder into the current information map. The INSERT FOLDER statement of the INFOMAPS procedure has the following syntax: INSERT FOLDER "folder-name" <options>; where "folder-name" specifies the name of the map folder to insert into the current information map. The INSERT FOLDER statement of the INFOMAPS procedure includes the following optional arguments:

CUSTOM_PROPERTIES=(custom-properties-list), which specifies additional properties for the folder where the form of the custom-properties-list value is ("property-name-1" "property-value-1" <"description-1">) . . . ("property-name-n" "property-value-n" <"description-n">);

DESCRIPTION="descriptive-text", which specifies the description of the folder that is created;

LOCATION="parent-folder-name" </CREATE>; and

LOCATION="parent-folder-name-location" </CREATE>, which specifies the parent folder of the folder being inserted into the information map.

The INSERT IDENTITY_PROPERTY statement of the INFOMAPS procedure adds an identity property or all available identity properties to the current information map where the available identity properties include:

EXTERNAL_IDENTITY, which inserts the SAS.ExternalIdentity property such that when a filter that uses this property is executed, the connected client's identity value (for example, employee ID) is substituted in the filter expression;

IDENTITY_GROUP_NAME, which inserts the SAS.IdentityGroupName property such that when a filter that uses this property is executed, the connected client's group name is substituted in the filter expression;

IDENTITY_GROUPS, which inserts the SAS.IdentityGroups property such that when a filter that uses this property is executed, a list of the names of the user groups and roles to which the connected client belongs (directly, indirectly, or implicitly) is substituted in the filter expression;

IDENTITY_NAME, which inserts the SAS.IdentityName property and is a generalization of SAS.PersonName and SAS.IdentityGroupName such that when a filter that uses this property is executed, the connected client's user name or group name is substituted in the filter expression;

PERSON_NAME, which inserts the SAS.PersonName property such that when a filter that uses this property is executed, the connected client's name is substituted in the filter expression; and USERID, which inserts the SAS.Userid property such that when a filter that uses this property is executed, the connected client's authenticated user ID, normalized to the uppercase format USERID or USERID@DOMAIN, is substituted in the filter expression.

The INSERT RELATIONSHIP statement of the INFOMAPS procedure inserts a join into the current information map. The INSERT RELATIONSHIP statement of the INFOMAPS procedure has the following syntax: INSERT RELATIONSHIP CONDITION="conditional-expression" LEFT_TABLE="data-source-ID-1" RIGHT_TABLE="data-source-ID-2" <options>; where CONDITION="conditional-expression" specifies the columns to be joined to create a single relationship between two tables where the columns referenced in the conditional expression are qualified with the associated data source ID and enclosed in double angle brackets (<< >>); LEFT_TABLE="data-source-ID-1" specifies the data source ID of the first table in the relationship; and RIGHT_TABLE="data-source-ID-2" specifies the data source ID of the second table in the relationship. The INSERT RELATIONSHIP statement includes the following optional arguments:

CARDINALITY=ONE_TO_ONE|ONE_TO_MANY|MANY_TO_ONE|MANY_TO_MANY|UNKNOWN, which describes the relationship between rows in the first data source and rows in the second data source;

CUSTOM_PROPERTIES=(custom-properties-list), which specifies additional properties for the folder where the form of the custom-properties-list value is ("property-name-1" "property-value-1" <"description-1">) . . . ("property-name-n" "property-value-n" <"description-n">);

DESCRIPTION="descriptive-text", which specifies the description of the relationship, which can be viewed by the information map consumer;

ID="relationship-ID", which specifies the ID of the relationship to be inserted; and JOIN=INNER|LEFT|RIGHT|FULL, which specifies the type of join selected from INNER, LEFT, RIGHT, and FULL, where INNER returns all the rows in one table that have one or more matching rows in the other table; LEFT returns all the rows in the specified left table, plus the rows in the specified right table that match rows in the left table; RIGHT returns all the rows in the specified right table, plus the rows in the specified left table that match rows in the right table; and FULL returns all the rows in both tables.

The LIST statement of the INFOMAPS procedure lists the key properties of data in the current information map of some or all object types that include the data items, filters, data sources, and relationships defined in the current information map. The properties of the data items include the name, ID, folder location, description, expression text, expression type, classification, format, and the default aggregation (if the classification is a measure) of each data item. The properties of the data sources include data source (library.physical-table), data source ID, table or cube name, description, and whether the data source is designated as required. The properties of the filters include the name, ID, folder location, description, and the conditional expression text of each filter. The properties of the relationships include the ID, left table, right table, cardinality, join type, and the join expression text.

The MOVE DATAITEM statement of the INFOMAPS procedure moves one or more data items to a new location. The MOVE FILTER statement of the INFOMAPS procedure moves one or more filters to a new location. The MOVE FOLDER statement of the INFOMAPS procedure moves a folder to a new location.

The NEW INFOMAP statement of the INFOMAPS procedure creates a new information map and includes the following optional arguments:

ALLOW_DRILL_THROUGH=YES|NO, which specifies whether users can drill down to detail data;

AUTO_REPLACE=YES|NO, which indicates whether the specified information map is automatically replaced if it already exists;

CREATE_TARGET_FOLDER=YES|NO, which specifies whether to automatically create a folder when inserting all data items from a data source;

CUSTOM_PROPERTIES=(custom-properties-list), which specifies additional properties for an information map;

DATA_LOCALE="locale-name", which specifies a supported locale value that is used as the data locale of the information map being created;

DESCRIPTION="descriptive-text", which specifies the description of the information map that is created;

INIT_CAP=YES|NO, which specifies whether to capitalize the first letter of each word in the data item name;

JOIN_MODEL=BASIC|ADVANCED, which specifies the join strategy that is used during query generation;

MAPPATH="location" </CREATE>, which specifies the location within the SAS folders tree for the new information map;

REPLACE_UNDERSCORES=YES|NO, which specifies whether to replace each underscore (_) character in the data item name with a blank space;

USE_LABELS=YES|NO, which specifies whether to create the data item name using the column label (if available) instead of the column name; and VERIFY=YES|NO, which specifies whether the INFOMAPS procedure verifies the validity of data items, filters, and relationships in subsequent Insert or Update operations.

The SET ASSIGNED_FILTERS statement of the INFOMAPS procedure assigns filters that are applied whenever the associated data sources are referenced in a query. The DEFINITION=(<data-source-filters-1< . . . data-source-filters-n>>) argument defines filter assignments for one or more data sources. The <data-source-filters-1> value has the form: "data-source-ID" (<PREFILTERS=("filter-ID-1 < . . . "filter-ID-n">)><RESULTS_FILTERS=("filter-ID-1 < . . . "filter-ID-n">)>), where the "data-source-ID" value specifies an identifier of the data source to which the assigned filters are applied, the <PREFILTERS=> value specifies one or more filters that are applied before the specified data source is used, the <RESULTS_FILTERS=> value specifies one or more filters that are applied after query results are generated, and the "filter-ID-1" value specifies the identifier (ID) of a filter defined in the information map.

The SET STORED PROCESS statement of the INFOMAPS procedure associates a stored process with the current information map. The UPDATE CURRENT_INFOMAP statement of the INFOMAPS procedure updates the current information map. The UPDATE DATAITEM statement of the INFOMAPS procedure updates the properties of a specified data item in the current information map. The UPDATE DATASOURCE statement of the INFOMAPS procedure updates the properties of a data source in the current information map. The UPDATE FILTER statement of the INFOMAPS procedure updates the properties of a specified filter in the current information map. The UPDATE FOLDER statement of the INFOMAPS procedure updates the properties of a folder in the current information map. The UPDATE INFOMAP statement of the INFOMAPS procedure updates an existing information map. The UPDATE RELATIONSHIP statement of the INFOMAPS procedure updates the properties of a specified join relationship in the current information map.

An engine is a component of software that reads from or writes to a file in a particular format. For illustration, example engines supported by the SAS/ACCESS® for Relational Databases Software, which reads, writes, and updates data, and which was developed and is provided by SAS Institute Inc. of Cary, N.C., USA, include:

ASTER, which specifies the SAS/ACCESS engine name for the Aster interface to a DBMS implemented using Aster Data Systems of San Carlos, Calif. USA;

DB2, which specifies the SAS/ACCESS engine name for the DB2 interface to a DBMS implemented using DB2 from IBM Corporation of Armonk, N.Y., USA;

GREENPLM, which specifies the SAS/ACCESS engine name for the Greenplum interface to a DBMS implemented using Greenplum from Pivotal Software Inc. of San Mateo, Calif., USA;

HADOOP, which specifies the SAS/ACCESS engine name for the Hadoop interface to a DBMS implemented using Apache Hadoop from the Apache Software Foundation;

IMPALA, which specifies the SAS/ACCESS engine name for the Impala interface to a DBMS implemented using Impala from Cloudera Inc. of Palo Alto, Calif., USA;

INFORMIX, which specifies the SAS/ACCESS engine name for the Informix interface to a DBMS implemented using Informix from IBM Corporation of Armonk, N.Y., USA;

SQLSVR, which specifies the SAS/ACCESS engine name for the Microsoft SQL Server interface to a DBMS implemented using Microsoft SQL Server from Microsoft Corporation of Redmond, Wash., USA;

NETEZZA, which specifies the SAS/ACCESS engine name for the Netezza interface to a DBMS implemented using Netezza from Netezza of Marlborough, Mass., USA;

ORACLE, which specifies the SAS/ACCESS engine name for the Oracle interface to a DBMS implemented using Oracle RDBMS from Oracle Corporation of Santa Clara, Calif., USA;

SAPHANA, which specifies the SAS/ACCESS engine name for the SAP HANA interface to a DBMS implemented using SAP HANA from SAP SE of Walldorf Germany;

SYBASE, which specifies the SAS/ACCESS engine name for the SAP SE interface to a DBMS implemented using SAP Sybase from SAP SE of Walldorf Germany;

TERADATA, which specifies the SAS/ACCESS engine name for the Teradata interface to a DBMS implemented using Teradata from Teradata Corporation of Dayton, Ohio, USA;

VERTICA, which specifies the SAS/ACCESS engine name for the Vertica interface to a DBMS implemented using Vertica Analytics Platform from Vertica of Cambridge, Mass., USA;

SASIOLA, which specifies the SAS/ACCESS engine name for the SAS® LASR™ Analytic Server interface to a DBMS implemented using the SAS® LASR™ Analytic Server SAS Institute Inc. of Cary, N.C., USA;

MYSQL, which specifies the SAS/ACCESS engine name for the MySQL interface to a DBMS implemented using MySQL from Oracle Corporation of Santa Clara, Calif., USA;

POSTGRES, which specifies the SAS/ACCESS engine name for the PostgreSQL interface to a DBMS implemented using PostgreSQL from The PostgreSQL Global Development Group.

Using the SAS/ACCESS Software for illustration, a LIBNAME statement assigns a library reference and specifies an engine. The library reference specifies a DBMS database, schema, server, or group of tables and views. The LIBNAME statement has the syntax LIBNAME libref engine-name <SAS/ACCESS-connection-options><SAS/ACCESS-LIBNAME-options>; where the argument libref specifies a name that serves as an alias to associate with a database, schema, server, or group of tables and views and the argument engine-name specifies the SAS/ACCESS engine name based on the type of DBMS, such as one of those listed above (e.g., ORACLE, DB2, SASIOLA). The optional argument <SAS/ACCESS-connection-options> provides connection information and controls how the timing and concurrence of the connection to the DBMS is managed. The arguments may be different for each type of DBMS. The optional argument <SAS/ACCESS-LIBNAME-options> defines how DBMS objects are processed.

For illustration, Base SAS® developed and provided by SAS Institute Inc. of Cary, N.C., USA, provides an Information Maps engine named INFOMAPS that works like other SAS data access engines. The syntax is LIBNAME libref INFOMAPS MAPPATH="location" <options>. Instead of the libref argument being associated with the physical location of a library, the libref argument is associated with a name that refers to a metadata server library to be accessed. The information maps contain metadata that the INFOMAPS engine uses to provide data access to users. The argument MAPPATH="location" specifies a path to a location of the information maps within the metadata server. Options for connecting to the SAS Metadata Server include:
  DOMAIN="authentication-domain", which specifies an authentication domain in the metadata server that is associated with the user ID and password;
  METACREDENTIALS=YES|NO, which specifies whether the user ID and password specified in the METAUSER= and METAPASS=system options are retrieved and used to connect to the metadata server when the METAUSER= and METAPASS= options for the LIBNAME statement are omitted;
  METAPASS="password", which specifies the password that corresponds to the user ID that connects to the metadata server;
  METAPORT=port-number, which specifies the TCP port that the metadata server is listening to for connections;
  METASERVER="address", which specifies the network IP address of the computer that hosts the metadata server;
  METAUSER="user-ID", which specifies the user ID to connect to the metadata server; and
  SSPI=YES|NO, which specifies whether Integrated Windows Authentication is used.
Other Options for the Information maps engine include:
  AGGREGATE=YES|NO, which specifies whether detailed data or aggregated data is retrieved from the data source;
  EXPCOLUMNLEN=integer, which specifies a length of a character column when a data item defined with an expression is encountered;
  PRESERVE_MAP_NAMES=YES|NO, which specifies how information map names are handled;
  READBUFF=integer, which specifies a number of rows to hold in memory for input; and
  SPOOL=YES|NO, which specifies whether a spool file is created.

In an operation 420, prologue code is written to replication code file 226. For example, the prologue code specifies options to connect to the metadata server, to define a library that points to the location of the external function lookup table that extends the list of supported database functions, and to define another library that points to the location of the input database 102, and includes an initial portion of the INFOMAPS procedure code to create a new information map. Later, replication code may be repeated for things like data sources, joins, and data items based on the loaded model. Example prologue code is shown below where * indicates a comment line that provides additional information for the block of code below the comment:
* Options to connect to the metadata server that are included in the file specified
* above by the infoMapOptions option;
options metaserver='server-name'
  metaport=server-port
  metauser='user-id'
  metapass='user-password';
* Library containing table of additional external functions that are used by the
* PHCDATA library below. The value of '/directory/subdirectory/' is included in the file
* specified above by the infoMapOptions option;
  libname extfunc '/directory/subdirectory/' access=read;
* Library for input database. The values of "phcdata" and the library name,
* 'PHC Clinical Trial Data', are included in the file specified above by the
* infoMapOptions option;
  libname phcdata meta library='PHC Clinical Trial Data';
* Begin IMAP generation—specify IMAP storage location. The values of mappath
* and "domain" are included in the file specified above by the infoMapOptions option;
  proc infomaps mappath='/meta-folder/meta-subfolder/'
    domain='authentication-domain;
* Specify the IMAP name and general options;
  new infomap 'PHC Clinical Trial 1'
    description='Trial results for protocols ABC 123 and XYZ 987'
    create_target_folder=yes
    auto_replace=yes
    init_cap=no
    replace_underscores=no
    use_labels=no
    verify=no;
"PHC Clinical Trial 1" is the name of IMAP 228 and is retrieved from the model loaded into memory. It is the name of the semantic layer, which is not a physical filename. A value of "description" is also retrieved from the model loaded into memory and is the description of the semantic layer. For example, the name of semantic layer file 312 may be "Clinical01.unv", while the name of the semantic layer is "PHC Clinical Trial 1". The other options in this statement are defined from options included in the file specified above by the infoMapOptions option.

For example, 'PHC Clinical Trial 1' is the name of IMAP 228 and mappath='/meta-folder/meta-subfolder/' indicates a location of the metadata repository indicated by the fifth indicator.

In an operation 422, data source information is identified from the loaded model. For example, data source information includes information retrieved from the loaded model that identifies object, table, and column information. The retrieved information is used to create the INFOMAPS procedure code stored in replication code file 226 for data sources. For example, objects are enclosed within "<< >>", embedded quotes are handled, extra parentheses are added where needed, original expressions are mapped to SAS-specific expressions, etc.

The model loaded into memory contains many different types of objects, and one of those objects is a design package. A design package is a collection of other objects and information, such as a table name and description. For illustration, a literal string "* - - - Data Sources - - - ;" is written to replication code file 226, and the following code is executed:

```
packageIterator = model.getDesignPackageIterator( );
while (packageIterator.hasNext( )) {
    MIRNamespaceElement aPackage = packageIterator.next( );
    if ( MIRElementType.DESIGN_PACKAGE ==
    aPackage.getElementType( ) ) {
        processDataSources((MIRDesignPackage)aPackage);
    }
}
```

The executed code iterates over all of the design packages and sends them one-by-one to be processed by the "processDataSources" method, which recursively inspects the design package and identifies table objects. If the design package does not include a table object, the "processDataSources" method exits for that design package.

In an operation 424, data source information code is written to replication code file 226 based on the identified data source information. Example data source information code is shown below for four tables:

```
insert datasource
    table = 'PHC Clinical Trial Data'.'PHCDEMOG'
    description = 'Patient demographics.'
    sasserver = 'SASApp'
    id = 'PHCDEMOG';
```

```
insert datasource
    table = 'PHC Clinical Trial Data'.'PHCTRT'
    description = 'Treatment administered.'
    sasserver = 'SASApp'
    id = 'PHCTRT';
```

```
insert datasource
    table = 'PHC Clinical Trial Data'.'PHCAE'
    description = 'Adverse events by visit.'
    sasserver = 'SASApp'
    id = 'PHCAE';
```

```
insert datasource
    table = 'PHC Clinical Trial Data'.'PHCLAB'
    description = 'Lab results by visit.'
    sasserver = 'SASApp'
    id = 'PHCLAB';
```

"PHC Clinical Trial Data" is a name of the library defined in the file specified above by the infoMapOptions option and "SASApp" is a name of an application server also specified in the file specified above by the infoMapOptions option. The value of description is read from the physical table in input database 102 and is used if present. Not all databases support table descriptions. For illustration, "PHCDEMOG" is a name of a physical table retrieved from the model. The name of the physical table is used for the ID value.

For further illustration, the code below creates the "insert datasource" code for each physical table object.

```
if (description == null) {
    description = _libname + "." + table;
    try {
        out.write("insert datasource" + nl);
        out.write(tab + "table    = " + handleQuote(_libraryname) + "." +
           handleQuote(table) + nl);
        out.write(tab + "description = " + handleQuote(description) + nl);
        out.write(tab + "sasserver = " + handleQuote(sasServer) + nl);
        out.write(tab + "id       = " + handleQuote(id) + ";"+ nl + nl);
        out.flush( );
    }
}
```

In an operation 426, alias information is identified from the loaded model. An alias is a reference to a physical data source. An alias may be used to avoid restrictions, such as an inability to join the same two tables more than once. An alias is made for one table, and the alias table is joined to the second table. The code for inserting alias tables is substantially the same as that described above for inserting data source information, except a different algorithm is used to determine the identifier (id) value.

In an operation 428, alias information code is written to replication code file 226 based on the identified alias information. In replication code file 226, alias information code is another INSERT DATASOURCE statement to create the alias table. For example, objects are enclosed within "<< >>", embedded quotes are handled, extra parentheses are added where needed, original expressions are mapped to SAS-specific expressions, etc. Example alias information code is shown below to create an alias table:

```
insert datasource
    table = 'PHC Clinical Trial Data'.'PHCAE'
    description = 'Alias for table PHCAE.'
    sasserver = 'SASApp'
    id = 'AdverseEvents';
```

In an operation 430, relationship information is identified from the loaded model to identify information needed to join tables such as using the INSERT RELATIONSHIP statement of the INFOMAPS procedure in replication code file 226. For illustration, a literal string "* - - - Relationships - - - ;" is written to replication code file 226, and the following code is executed:

```
packageIterator = model.getDesignPackageIterator( );
while (packageIterator.hasNext( )) {
    MIRNamespaceElement aPackage = packageIterator.next( );
    if ( MIRElementType.DESIGN_PACKAGE ==
    aPackage.getElementType( ) ) {
        processRelationships((MIRDesignPackage)aPackage);
    }
}
```

The executed code iterates over all of the design packages and sends them one-by-one to be processed by the "processRelationships" method, which recursively inspects the design package to identify any join objects. If the design package does not include a join object, the "processRelationships" method exits for that design package. The join objects include two tables that need to be joined and the condition(s) used for joining the tables. First, a MITI method, "MIRExpression expression=fm.getExpression( )", is called to return an expression object, MIRExpression that may have the Java object type. A "processExpression" method examines the returned expression object and constructs the condition used in the join. For illustration, the statement, "ConditionInfo condition=_infoMap.processExpression(fm.getExpression( ));", performs this function.

The expression object may be a node tree that contains individual parts of an expression. There are instances where filters may be represented as joins in the model. For illustration, the following code identifies valid joins for joining tables when true:

```
if( null != condition.getRightTable( ) &&
    !condition.getLeftTable( ).equals(condition.getRightTable( )))
```

When not true, two tables are not joined. Instead, a filter is defined by the identified relationship information.

In an operation 432, the identified relationship information is processed to define a relationship expression. For example, objects are enclosed within "<< >>", embedded quotes are handled, extra parentheses are added where needed, original expressions are mapped to SAS-specific expressions, each relationship expression is evaluated and transformed into a SAS-usable expression, the tables participating in the join and the cardinality are identified, etc.

For example, the following individual parts may be identified to define the relationship expression to join two tables:

```
left table 1: PHCDEMOG
left table 1 column: PROTOCOL
right table 1: PHCTRT
right table 1 column: PROTOCOL
operator 1: =
operator 2: and
```

```
left table 2: PHCDEMOG
left table 2 column: PATIENT
right table 2: PHCTRT
right table 2 column: PATIENT
operator 3: =
```

This relationship information is used to construct a condition:
"(<<PHCDEMOG.PROTOCOL>>=<<PHCTRT.PROTOCOL>> and <<PHCDEMOG.PATIENT>>=<<PHCTRT.PATIENT>>)'".

Referring to FIG. 4b, in an operation 434, a determination is made concerning whether or not two tables are joined. If two tables are joined, processing continues in an operation 436. If two tables are not joined, processing continues in an operation 438.

In operation 436, relationship information code is written to replication code file 226 based on the defined relationship expression. For example, objects are enclosed within "<< >>", embedded quotes are handled, extra parentheses are added where needed, original expressions are mapped to SAS-specific expressions, etc. Processing continues in an operation 440. Example relationship information code is shown below:

```
insert relationship
    condition = '(<<PHCDEMOG.PROTOCOL>> =
    <<PHCTRT.PROTOCOL>>
        and <<PHCDEMOG.PATIENT>> = <<PHCTRT.PATIENT>>)'
    left_table = 'PHCDEMOG'
    right_table = 'PHCTRT'
    cardinality = ONE_TO_MANY
    join = INNER
    id = 'join_1';
insert relationship
    condition = '(<<PHCAE.PROTOCOL>> =
    <<PHCLAB.PROTOCOL>>
        and <<PHCAE.PATIENT>> = <<PHCLAB.PATIENT>>
        and <<PHCAE.VISIT>> = <<PHCLAB.VISIT>>)'
    left_table = 'PHCAE'
    right_table = 'PHCLAB'
    cardinality = ONE_TO_MANY
    join = INNER
    id = 'join_2';
```

In operation 438, the defined relationship expression is added to a filter list to be treated as an assigned filter. The filter list may be stored as an array, a list, a linked list, contiguously in memory, etc. As indicated by the test above, an assigned filter either has no right table or the left and right tables are the same. The "AF AE Protocol" and "AF Lab Visit" assigned filters below are examples of the assigned filter having no right table. The assigned filter(s) are stored for later processing to add the code toward an end of code replication file 226, instead of with actual table joins. Processing continues in operation 440.

In operation 440, dimension information that has been defined in the semantic layer is identified from the loaded model. In some semantic layers, a dimension is modeled as a folder structure that organizes items. The folder structure defines the logical groupings.

In an operation 442, folder creation code is written to replication code file 226 based on the identified dimension information. For example, logical groupings are identified and information contained within the logically grouped items is retrieved, objects are enclosed within "<< >>", embedded quotes are handled, extra parentheses are added where needed, original expressions are mapped to SAS-specific expressions, etc. For illustration, the following code is executed:

```
packageIterator = model.getDesignPackageIterator( );
while (packageIterator.hasNext( )) {
    MIRNamespaceElement aPackage = packageIterator.next( );
    if ( MIRElementType.DESIGN_PACKAGE ==
    aPackage.getElementType( ) ) {
        processDimensions((MIRDesignPackage)aPackage);
    }
}
```

The "processDimensions" method writes the string "* - - - '<folder name here>' Folder - - - ;" to replication code file 226 once for each new folder before writing the folder creation code to replication code file 226.

For example, the following is written to replication code file 226:

```
* ---------- 'Demography' Folder ---------- ;
insert folder 'Demography'
    description = 'Patient age, gender, height, weight, etc.'
    location    = '/' /create;
* ---------- 'Adverse Events' Folder ---------- ;
insert folder 'Adverse Events'
```

```
    description = 'Visit number, date, code, term, severity'
    location    = '/' /create;
```

In an operation 444, dimension feature maps are iterated to identify dimension attributes and measures. In an operation 446, the identified dimension attributes and measures are processed to define a feature map expression. For example, objects are enclosed within "<< >>", embedded quotes are handled, extra parentheses are added where needed, for each dimension attribute or measure, an expression is evaluated and transformed into a SAS-usable expression or condition. The expression or condition is defined in the semantic layer to create the dimension attribute or measure from the underlying data source. For example, a MITI method is called that returns collections of information called "feature maps". Feature maps for dimensions are identified and information needed to process the dimensions is extracted. A similar process is used for filter feature maps described later.

Feature maps are objects that contain information needed to construct the INSERT DATAITEM code: the data item name, description, folder (dimension) it's associated with, the expression object(s), and the data type. This information is extracted from the feature maps and used to construct the INSERT DATAITEM code below. The expression objects are processed in much the same way as described above by the "processRelationships" method. A data item name for the ID is used unless it has already been used or is otherwise not unique within the first 32 characters. If not unique, a counter can be added to the beginning or end of the name to make it unique within the first 32 characters.

If the semantic layer indicates that a data item is "hidden", INSERT DATAITEM code may still be written to replication code file 226, but preceded with an asterisk (*) to cause the statement to be treated as a comment. Thus, the item is not created in IMAP 228, but the user can hand-edit the file in the future to include it (make it "unhidden") in IMAP 228.

Within a dimension, data objects that are associated with that dimension are identified, and the information is transformed into "insert dataitem" statements. Before writing the "insert dataitem" statement, the data sources used in the expression are examined. Data sources can be of 2 types: (1) a column in a physical table such as "PHCAE.AETEXT" referenced below, or (2) a business data item such as "root.Protocol Identifier" referenced below.

In an operation 448, a determination is made concerning whether or not the feature map expression references a data item that has not yet been processed. If the feature map expression references a data item that has not yet been processed, processing continues in an operation 452. If the feature map expression does not reference a data item that has not yet been processed, processing continues in an operation 450.

In operation 450, data item code is written to replication code file 226 based on the identified dimension attributes and measures. Data items are associated with a folder. For example, objects are enclosed within "<< >>", embedded quotes are handled, extra parentheses are added where needed, original expressions are mapped to SAS-specific expressions, etc. Processing continues in an operation 454. Example data item code is shown below:

```
insert dataitem
    name = 'Preferred Term'
    description = 'Symptom description'
    folder = 'Adverse Events'
    expression = '<<PHCAE.AETEXT>>'
    type = character
    id = 'Preferred Term';
insert dataitem
    name = 'Severity'
    description = 'Severity code: 1, 2, or 3'
    folder = 'Adverse Events'
    expression = '<<PHCAE.AESEV>>'
    type = numeric
    id = 'Severity';
insert dataitem
    name = 'Severity (Char)'
    description = 'Severity: Mild, Moderate, or Severe'
    folder = 'Adverse Events'
    expression = 'case
        when <<PHCAEORI.AESEV>> eq 1 then "Mild"
        when <<PHCAEORI.AESEV>> eq 2 then "Moderate"
        when <<PHCAEORI.AESEV>> eq 3 then "Severe"
        end'
    type = character
    id = 'Severity (Char)';
insert dataitem
    name = 'Lab Test'
    description = 'Name of laboratory test'
    folder = 'Lab Results'
    expression = '<<PHCLAB.LABTEST>>'
    type = character
    id = 'Lab Test';
```

In operation 452, the data items that reference another data item that has not yet been processed are added to a delayed data items list. The delayed data items may be stored as an array, a list, a linked list, contiguously in memory, etc. After all data items are processed, the delayed data items that were previously saved are iteratively processed, and the data item code written to replication code file 226. Processing continues in operation 454.

Referring to FIG. 4c, in operation 454, filter information is identified from the loaded model. In an operation 456, the filter information is processed to define a filter expression. For example, each filter expression is parsed and mapped to SAS-specific expressions, objects are enclosed within "<< >>", embedded quotes are handled, extra parentheses are added where needed, etc.

In an operation 458, filter expression code is written to replication code file 226 based on the defined filter expression. Example filter expression code is shown below:

```
insert filter
    name = 'Protocol ABC 123'
    description = 'Select data for protocol ABC 123'
    condition = '<<root.Protocol Identifier>> = "ABC 123"'
    folder = 'Filters'
    id = 'Protocol ABC 123';
```

In an operation 460, a determination is made concerning whether or not a filter list was created in operation 438. If the filter list was created, processing continues in an operation 462. If the filter list was not created, processing continues in an operation 470.

In operation 462, the filter list is processed to define a filter relationship. For example, each filter relationship is transformed as needed and inserted as a condition of an assigned filter. Assigned filters are filters that are applied to queries that reference the data source with which the filter is associated and to queries for which the associated data source is marked as required. There are two types of assigned filters, "prefilters" and "results filters". In an illustrative embodiment, the assigned filter is a prefilter. A prefilter subsets the data in its associated data source before any other part of a query is run. The generated query contains a subquery that ensures that no data is consumed without the filter being applied.

In an operation 464, assigned filters folder code is written to replication code file 226 based on the defined filter relationship. An "Assigned Filters" folder is created to hold an assigned filter. Example assigned filters folder code is shown below:

```
insert folder 'Assigned Filters'
    description = 'Filters always applied to a data source.'
    location = '/';
```

In an operation 466, assigned filters code is written to replication code file 226 based on the defined filter relationship. For example, the "Force IP Filter 1" is assigned to every table to insure an implicit pass-through to the database happens. The remaining assigned filters are assigned only to the tables used by the filter. Example assigned filters code is shown below:

```
insert filter
    name = 'Force IP Filter 1'
    description = 'Forces Implicit Pass-through (IP)'
    condition = 'coalesce(0,1) ne .'
    folder = 'Assigned Filters'
    id = 'forceip_filter_1';
insert filter
    name = 'AF AE Protocol'
    description = 'Assigned filter to restrict AE protocols'
    condition = '<<PHCAE.PROTOCOL>> in ("ABC 123", "XYZ 987")'
    folder = 'Assigned Filters'
    id = 'AF_AE_Protocol';
insert filter
    name = 'AF Lab Visit'
    description = 'Assigned filter to restrict lab visits'
    condition = '<<PHCLAB.VISIT>> le 10'
    folder = 'Assigned Filters'
    id = 'AF_Lab_Visit';
```

The condition for the "Force IP Filter 1" filter is read from <Option name="force_ip1" value="coalesce(0,1) ne."/> included in the file specified above by the infoMapOptions option. If the option is not present in the file specified above by the infoMapOptions option or if the option value is blank, this filter may not be created.

In an operation 468, set assigned filters code is written to replication code file 226. Example set assigned filters code is shown below:

```
set assigned_filters
    definition = (
        'PHCDEMOG' (prefilters=('forceip_filter_1'))
        'PHCTRT' (prefilters=('forceip_filter_1'))
        'PHCAE' (prefilters=('forceip_filter_1' 'AF_AE_Protocol'))
        'PHCLAB' (prefilters=('forceip_filter_1' 'AF_Lab_Visit'))
    );
```

In an operation 469, format code is written for all character data items. For illustration, the delayed processing of character data items, "unsets" a default display format that may be automatically assigned. The code "update dataitem 'name-of-data-item-here' format=''" is added to replication code file 226 for each delayed data item on the delayed data items list. Illustrative delayed data item code is shown below:

```
update dataitem 'Preferred Term' format='';
update dataitem 'Severity (Char)' format='';
update dataitem 'Lab Test' format='';
```

In operation 470, epilogue code is written to replication code file 226. For example, the epilogue code may include a "save" statement that saves the current information map; a "run" statement that executes the procedure; and a "quit" statement that terminates execution of the procedure. Example epilogue code is shown below:

```
save;
run;
quit;
```

In an operation 472, replication code file 226 is saved and closed. In an operation 474, replication code file 226 is executed to create IMAP 228. For illustration, an IMAP structure 500 is illustrated in FIG. 5. IMAP 228 may be stored to a metadata repository as discussed above.

Referring again to FIG. 4c, in an operation 476, data is transferred from input database 102 to output database 106 using IMAP 228. For example, transfer code is shown below using SAS/ACCESS:

```
libname extfunc '/directory/subdirectory/';
libname outdata engine-name libname-options;
libname imap infomaps mappath='/meta-folder/meta-subfolder/';
proc sql;
    create table outdata.BigData as select * from imap.'PHC Clinical
    Trial 1'n;
quit;
```

As discussed above, each SAS/ACCESS interface includes a data access engine specified by the "engine-name" argument. In the transfer code above, the "engine-name" argument is selected based on the DBMS type of output database 106 both of which were indicated in operation 402 based on the second indicator. In an alternative embodiment, when output database 106 is a traditional SAS table, no special engine needs to be specified, and Base SAS may be used.

In the second LIBNAME statement, the "mappath" argument specifies a location of the information maps within the metadata server. 'PHC Clinical Trial 1' specifies the name of IMAP 228 that is being used to transfer data from input database 102 to output database 106.

The CREATE statement has the syntax: "create table <table> as <query expression>". The SELECT statement is part of the <query expression>. The SELECT statement selects objects from IMAP 228, which in turn are translated to objects from input database 102. The SELECT statement may or may not directly access/select data from input database 102. "*" indicates selection of the entire content of IMAP 228, which may or may not be the entire content of input database 102. A result of the query could result in returning objects not included in input database 102. For example, the database could have the following three data columns:

| Lab Test | Standard Result | Standard Units |
|---|---|---|
| Creatinine | 86.0 | umol/L |

IMAP 228 could include the following computed item that does not exist in input database 102:

```
insert dataitem
  name='Standard Result with Units'
  description='Result with units included'
  folder='Lab Results'
  expression='to_char(<<PHLAB.LABSRSLT>>)||"
     ("||<<PHCLAB.LABSUNTS>>||")"'
  type=character
  id='Standard Result with Units';
```

The code "select 'Standard Result with Units' n from imap.'PHC Clinical Trial 1'n" results in "86.0 (umol/L)", which does not exist in input database 102, but now does exist in output database 106. Input database 102 is not simply copied to output database 106, but business rules are applied in the semantic layer to input database 102 and the result set written to output database 106, effectively giving the end user access to the original semantic layer, but from a different data storage/database that supports different reporting and analysis tools.

In an operation 478, data from input database 102 is accessed using IMAP 228 as the semantic layer instead of semantic layer file 312. For example, reporting, analysis, and visualization tools that are not capable of accessing input database 102 using semantic layer file 312 can analyze, visualize, and create reports from data stored in input database 102 using IMAP 228. For example, inclusion of the statement "libname imap infomaps mappath='/meta-folder/meta-subfolder/';" provides access to input database 102 using imap.'PHC Clinical Trial 1'n. The INFOMAPS engine in combination, for example, with Base SAS or SAS/ACCESS brings the data stored in input database 102 into a reporting, analysis, and/or visualization tool.

For example, using database conversion application 222 and IMAP 228, a user can move the data from a database or objects computed from the data such as an Oracle database to a distributed database such as Hadoop, to a non-distributed database such as Teradata, or to an analytic and visualization data source such as the SAS LASR Analytic Server, while maintaining the data processing rules imposed by the BusinessObjects Universe without knowledge of semantic layer file 312.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   read first semantic layer information from a semantic layer file defined for an input database, wherein the semantic layer information describes a business rule created to analyze data stored in the input database for a first report using a first type of semantic layer supported by a first reporting tool;
   convert the read first semantic layer information to converted semantic layer information using a metadata integration bridge;
   load the converted semantic layer information as a model;
   write prologue code to a replication code file based on the loaded model;
   identify data source information from the loaded model;
   write data source information code to the replication code file based on the identified data source information;
   write epilogue code to the replication code file;
   execute the code written to the replication code file to create second semantic layer information, wherein the created second semantic layer information describes the business rule created to analyze the data using a second type of semantic layer supported by a second reporting tool, wherein the second semantic layer information is a replicate of the first semantic layer information, wherein the first reporting tool is different from the second reporting tool; and
   access the data stored in the input database to create a second report by executing the business rule described by the created second semantic layer information.

2. The non-transitory computer-readable medium of claim 1, wherein the computer-readable instructions further cause the computing device to store the accessed data in an output database.

3. The non-transitory computer-readable medium of claim 2, wherein the input database is structured using a first type of database management/architecture system (DBMS) and the output database is structured using a second type of DBMS.

4. The non-transitory computer-readable medium of claim 3, wherein the second type of DBMS is a different type of DBMS from the first type of DBMS.

5. The non-transitory computer-readable medium of claim 3, wherein the second type of DBMS and the first type of DBMS are a same type of DBMS.

6. The non-transitory computer-readable medium of claim 1, wherein the business rule is configured to analyze the data using an analytic software tool.

7. The non-transitory computer-readable medium of claim 1, wherein the business rule is configured to analyze the data by computing a new field using one or more fields of the data.

8. The non-transitory computer-readable medium of claim 1, wherein the business rule is configured to analyze the data by computing a new column of data using one or more columns of the data.

9. The non-transitory computer-readable medium of claim 1, wherein the data stored in the input database is accessed through a database server.

10. The non-transitory computer-readable medium of claim 1, wherein the prologue code includes code to connect to a metadata server, code to define a library that points to a location of the input database, and code to name the second semantic layer information.

11. The non-transitory computer-readable medium of claim 10, wherein the prologue code further includes code to define a second library that points to a location of an external function lookup table that extends a list of supported database functions.

12. The non-transitory computer-readable medium of claim 1, wherein the epilogue code includes code to execute a procedure that creates the second semantic layer information.

13. The non-transitory computer-readable medium of claim 1, wherein the data source information includes information retrieved from the loaded model that identifies an object, a table, and column information associated with the described business rule.

14. The non-transitory computer-readable medium of claim 13, wherein the data source information code includes code to insert a data source into the second semantic layer information.

15. The non-transitory computer-readable medium of claim 1, wherein before executing the code, the computer-readable instructions further cause the computing device to:
identify filter information from the loaded model that is associated with the described business rule;
process the identified filter information to define a filter expression; and
write filter expression code to the replication code file based on the defined filter expression.

16. The non-transitory computer-readable medium of claim 1, wherein before executing the code, the computer-readable instructions further cause the computing device to:
identify relationship information from the loaded model that is associated with the described business rule;
process the identified relationship information to define a join expression; and
write relationship information code to the replication code file based on the defined join expression.

17. The non-transitory computer-readable medium of claim 1, wherein before executing the code, the computer-readable instructions further cause the computing device to:
identify dimension information from the loaded model that is associated with the described business rule; and
write folder creation code to the replication code file based on the identified dimension information.

18. The non-transitory computer-readable medium of claim 1, wherein before executing the code, the computer-readable instructions further cause the computing device to:
identify relationship information from the loaded model that is associated with the described business rule;
determine that the identified relationship information defines an assigned filter; and
write assigned filters code to the replication code file based on the identified relationship information.

19. The non-transitory computer-readable medium of claim 18, wherein before executing the code, the computer-readable instructions further cause the computing device to:
write assigned filters folder code to the replication code file based on the identified relationship information before writing the assigned filters code.

20. The non-transitory computer-readable medium of claim 18, wherein before executing the code, the computer-readable instructions further cause the computing device to:
write set assigned filters code to the replication code file based on the identified relationship information after writing the assigned filters code, wherein an assigned filter is applied whenever an associated data source is referenced in a query of the input database.

21. A computing device comprising:
a processor; and
a non-transitory computer-readable medium operably coupled to the processor, the computer-readable medium having computer-readable instructions stored thereon that, when executed by the processor, cause the computing device to
read first semantic layer information from a semantic layer file defined for an input database, wherein the semantic layer information describes a business rule created to analyze data stored in the input database for a first report using a first type of semantic layer supported by a first reporting tool;
convert the read first semantic layer information to converted semantic layer information using a metadata integration bridge;
load the converted semantic layer information as a model;
write prologue code to a replication code file based on the loaded model;
identify data source information from the loaded model;
write data source information code to the replication code file based on the identified data source information;
write epilogue code to the replication code file;
execute the code written to the replication code file to create second semantic layer information, wherein the created second semantic layer information describes the business rule created to analyze the data using a second type of semantic layer supported by a second reporting tool, wherein the second semantic layer information is a replicate of the first semantic layer information, wherein the first reporting tool is different from the second reporting tool; and
access the data stored in the input database to create a second report by executing the business rule described by the created second semantic layer information.

22. A method of converting semantic layer metadata to support a database conversion, the method comprising:
reading, by a computing device, first semantic layer information from a semantic layer file defined for an input database, wherein the semantic layer information describes a business rule created to analyze data stored in the input database for a first report using a first type of semantic layer supported by a first reporting tool;
converting, by the computing device, the read first semantic layer information to converted semantic layer information using a metadata integration bridge;
loading, by the computing device, the converted semantic layer information as a model;
writing, by the computing device, prologue code to a replication code file based on the loaded model;
identifying, by the computing device, data source information from the loaded model;
writing, by the computing device, data source information code to the replication code file based on the identified data source information;
writing, by the computing device, epilogue code to the replication code file;
executing, by the computing device, the code written to the replication code file to create second semantic layer information, wherein the created second semantic layer information describes the business rule created to analyze the data using a second type of semantic layer supported by a second reporting tool, wherein the second semantic layer information is a replicate of the first semantic layer information, wherein the first reporting tool is different from the second reporting tool; and accessing, by the computing device, the data stored in the input database to create a second report by executing the business rule described by the created second semantic layer information.

23. The computing device of claim 21, wherein the computer-readable instructions further cause the computing device to store the accessed data in an output database.

24. The computing device of claim 21, wherein before executing the code, the computer-readable instructions further cause the computing device to:
identify filter information from the loaded model that is associated with the described business rule;
process the identified filter information to define a filter expression; and
write filter expression code to the replication code file based on the defined filter expression.

25. The computing device of claim 21, wherein before executing the code, the computer-readable instructions further cause the computing device to:
identify relationship information from the loaded model that is associated with the described business rule;
process the identified relationship information to define a join expression; and
write relationship information code to the replication code file based on the defined join expression.

26. The computing device of claim 21, wherein before executing the code, the computer-readable instructions further cause the computing device to:
identify dimension information from the loaded model that is associated with the described business rule; and
write folder creation code to the replication code file based on the identified dimension information.

27. The method of claim 22, further comprising storing the accessed data in an output database.

28. The method of claim 22, further comprising, before executing the code:
identifying, by the computing device, filter information from the loaded model that is associated with the described business rule;
processing, by the computing device, the identified filter information to define a filter expression; and
writing, by the computing device, filter expression code to the replication code file based on the defined filter expression.

29. The method of claim 22, further comprising, before executing the code:
identifying, by the computing device, relationship information from the loaded model that is associated with the described business rule;
processing, by the computing device, the identified relationship information to define a join expression; and
writing, by the computing device, relationship information code to the replication code file based on the defined join expression.

30. The method of claim 22, further comprising, before executing the code:
identifying, by the computing device, dimension information from the loaded model that is associated with the described business rule; and
writing, by the computing device, folder creation code to the replication code file based on the identified dimension information.

* * * * *

UNITED STATES PATENT AND TRADEMARK OFFICE
CERTIFICATE OF CORRECTION

PATENT NO.        : 9,684,699 B2
APPLICATION NO.   : 14/956506
DATED             : June 20, 2017
INVENTOR(S)       : Vincent C. DelGobbo et al.

Page 1 of 1

It is certified that error appears in the above-identified patent and that said Letters Patent is hereby corrected as shown below:

On the Title Page

Item (57) Abstract, Line 11:
Delete "Epilog code" and replace with --Epilogue code--

In the Specification

Column 10, Line 56:
Delete ""metaport", "metaport"," and replace with --"metaport", "metauser",--

Column 16, Line 49:
Delete "qualifier (e.g., root.MODEL_ID>>)" and replace with --qualifier (e.g., <<root.MODEL_ID>>)--

Column 24, Line 9:
Delete "if(description == null) {" and replace with --if(description == null)--

Column 24, Line 18:
Delete "}"

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*